United States Patent
Dubeyko et al.

(10) Patent No.: US 12,118,397 B2
(45) Date of Patent: Oct. 15, 2024

(54) ACCELERATING DATA PROCESSING BY OFFLOADING THREAD COMPUTATION

(71) Applicants: Lemon Inc., Grand Cayman (KY); Beijing Youzhuju Network Technology Co. Ltd., Beijing (CN)

(72) Inventors: Viacheslav Dubeyko, Los Angeles, CA (US); Jian Wang, Beijing (CN)

(73) Assignees: Lemon Inc., Grand Cayman (KY); Beijing Youzhuju Network Technology Co. Ltd., Beijing (CN)

( * ) Notice: Subject to any disclaimer, the term of this patent is extended or adjusted under 35 U.S.C. 154(b) by 56 days.

(21) Appl. No.: 17/945,843

(22) Filed: Sep. 15, 2022

(65) Prior Publication Data
US 2024/0095076 A1 Mar. 21, 2024

(51) Int. Cl.
*G06F 9/50* (2006.01)
*G06F 9/48* (2006.01)
*G06F 15/78* (2006.01)

(52) U.S. Cl.
CPC .......... *G06F 9/5027* (2013.01); *G06F 9/4843* (2013.01); *G06F 15/7821* (2013.01)

(58) Field of Classification Search
CPC ... G06F 9/5027; G06F 9/4843; G06F 15/7821
See application file for complete search history.

(56) References Cited

U.S. PATENT DOCUMENTS

| | | | |
|---|---|---|---|
| 2014/0143524 A1* | 5/2014 | Tabaru | G06F 9/3887 712/221 |
| 2019/0041952 A1* | 2/2019 | Alameldeen | G06F 1/329 |
| 2020/0035291 A1* | 1/2020 | Kasibhatla | G11C 11/4087 |
| 2022/0188028 A1* | 6/2022 | Mesnier | G06F 3/067 |
| 2022/0237041 A1* | 7/2022 | Lee | G06F 9/541 |
| 2023/0026505 A1* | 1/2023 | Lee | G06F 3/0679 |
| 2023/0195375 A1* | 6/2023 | Puthoor | G06F 3/0631 711/154 |
| 2023/0259404 A1* | 8/2023 | Pinto | G06F 9/5027 718/104 |
| 2023/0267005 A1* | 8/2023 | Li | G06F 9/4881 718/104 |
| 2023/0305883 A1* | 9/2023 | Gumienny | G06F 9/505 |
| 2023/0316060 A1* | 10/2023 | Jain | G06F 9/30036 706/33 |

* cited by examiner

*Primary Examiner* — Shawn Doman
(74) *Attorney, Agent, or Firm* — BakerHostetler

(57) ABSTRACT

The present disclosure describes techniques for accelerating data processing by offloading thread computation. An application may be started based on creating and executing a process by a host, the process associated with a plurality of threads. Creating a plurality of computation threads on a storage device may be requested based on determining that the storage device represents a computational storage. The plurality of computation threads may be created based on preloading a plurality of libraries in the storage device. The plurality of libraries may comprise executable codes associated with the plurality of threads. Data processing associated with the plurality of threads may be offloaded to the storage device using the plurality of computation threads. Activities associated with the plurality of computation threads may be managed by the process.

20 Claims, 18 Drawing Sheets

1100

Start an application based on creating and executing a process by a host, the process associated with a plurality of threads 1102

Request for creating a plurality of computation threads on a storage device based on determining that the storage device represents a computational storage, wherein the plurality of computation threads are created based on preloading a plurality of libraries in the storage device, and wherein the plurality of libraries comprise executable codes associated with the plurality of threads 1104

Execute the plurality of computation threads on at least a portion of data in a massively parallel manner, wherein the data are stored on the storage device 1106

FIG. 11

ACCELERATING DATA PROCESSING BY OFFLOADING THREAD COMPUTATION

BACKGROUND

Companies and/or individuals, increasingly need to process a large quantity of data. Such data may come from a large quantity of data sources. However, the large quantity of available data and/or data sources may make it difficult for the companies and/or individuals to efficiently process the data. For example, data processing tasks may consume a large quantity of computing power and/or a large quantity of time. Improved techniques for data processing are desirable.

BRIEF DESCRIPTION OF THE DRAWINGS

The following detailed description may be better understood when read in conjunction with the appended drawings. For the purposes of illustration, there are shown in the drawings example embodiments of various aspects of the disclosure; however, the invention is not limited to the specific methods and instrumentalities disclosed.

FIG. 11 illustrates another example process for accelerating data processing in accordance with the present disclosure.

DETAILED DESCRIPTION OF ILLUSTRATIVE EMBODIMENTS

Modern computing paradigms and hardware stacks involve robust architectures that make the foundation of modern-day digital life. However, such paradigms are unable to provide a stable basis for growth of data processing performance. Big data and the growing volume of computing technology applications have exhausted the potential of the available computing paradigms. For example, a large percentage (i.e., about 80%) of machine instructions are generally operations for moving data. Thus, the majority of power consumption is spent not for computation but instead for data/instruction moving between the processing core and memory.

Modern computing paradigms may employ a multi-threaded model of application execution, with the goal of increasing data processing performance and using shared resources, such as central processing unit (CPU) cores, more efficiently. Multithreading is a model of execution that allows for multiple threads to be created within a process, executing independently but concurrently sharing process resources. In some embodiments, threads can run fully parallel if they are distributed to their own CPU core. However, increasing the number of CPU cores and/or the number of threads may introduce negative side effects, such as cache coherence issues, task scheduling overhead, memory wall problems, extensive moving data operations, and/or context switch overhead. Such negative side effects may negate or dramatically limit any potential performance improvement. Additionally, any persistent data stored in a storage device may need to be copied on the host side so that operations may be performed on the data and any modified data may need to be moved from the host side into the persistent memory for storage. This may lead to performance degradation for modern storage devices and may limit the opportunity to increase the performance of data processing operations.

Figure 1:
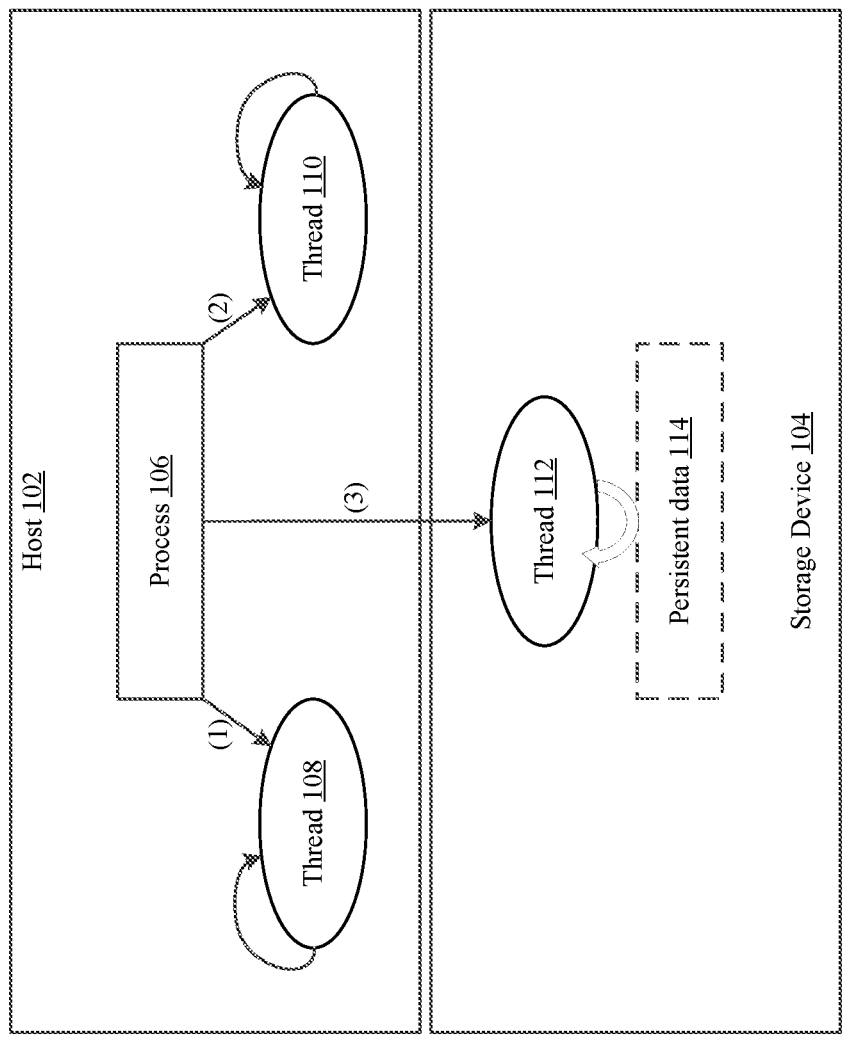
FIG. 1 illustrates an exemplary framework for offloading thread computation in accordance with the present disclosure.

A storage device may be configured to have computational power, and it may be possible to offload data processing into the storage device space. In embodiments, to offload data processing into the storage device space, thread computation may be offloaded into the storage device. FIG. 1 illustrates a framework 100 for accelerating data processing by offloading thread computation in accordance with the present disclosure. The framework 100 includes a host 102 and a storage device 104. The host 102 may include an application or process 106. To offload thread computation into the storage device, the process 106 may be started. For example, the process 106 may start at least one thread (e.g., thread 108 and/or thread 110 and/or any additional threads) on the host side for local computation. Such threads 108, 110 may not require a significant amount of data to be exchanged with the storage device 104. For example, such threads 108, 110 may not require a large amount of persistent data 114 to be moved from a persistent memory of the storage device 104 to the host 102. Operations that are more data intensive (e.g., those operations that require a significant or large amount of persistent data 114 to be moved from a persistent memory of the storage device 104 to the host 102) may instead be performed by the storage device 104 if the storage device 104 has computational power. This may be accomplished by offloading one or more threads 112 that require a significant amount of data to be exchanged with the storage device 104 into the storage device 104 to execute near-data computing. In this manner, the thread(s) 112 may be executed without a significant or large amount of persistent data 114 to be moved from a persistent memory of the storage device 104 to the host 102.

Figure 2:
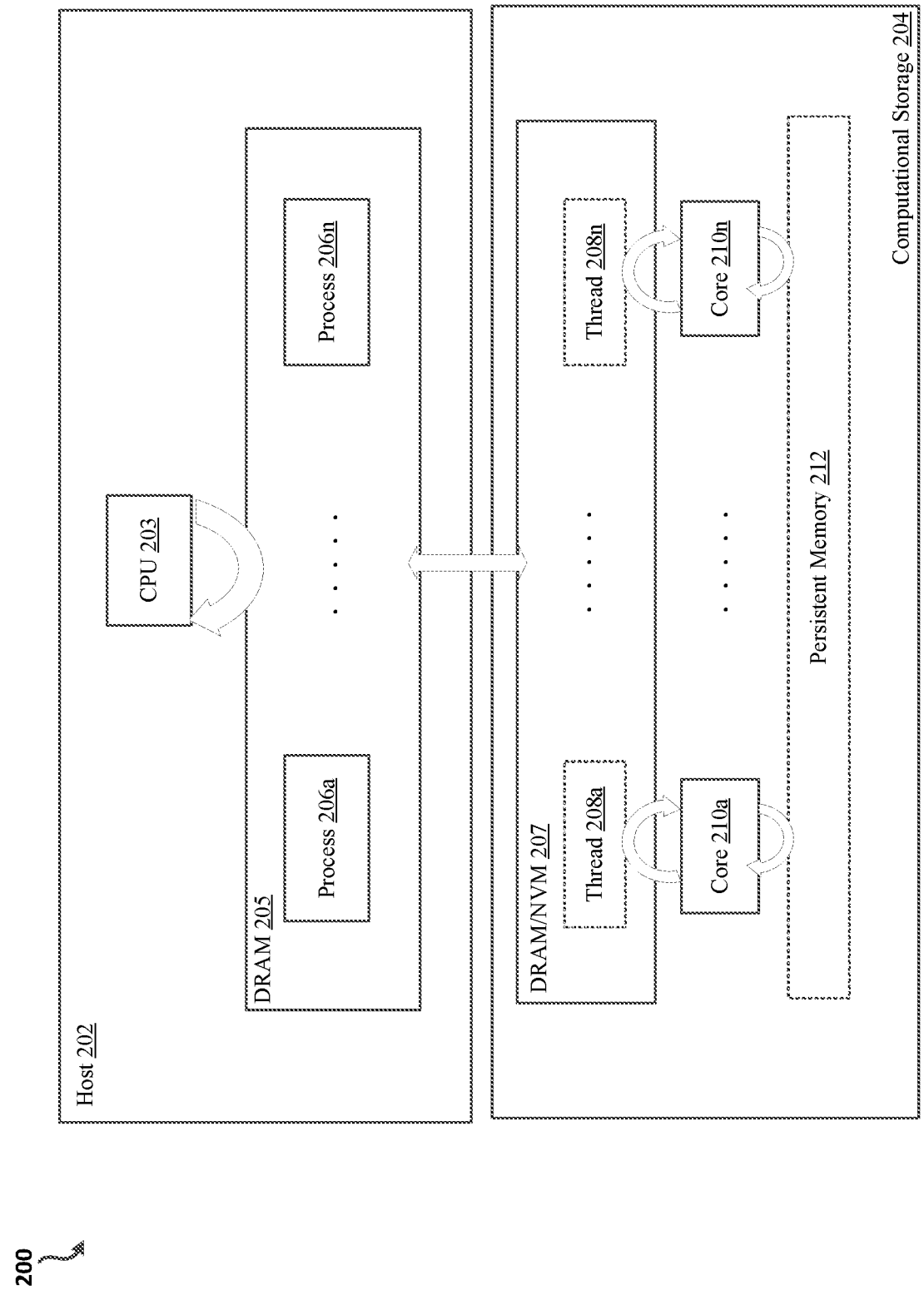
FIG. 2 illustrates another exemplary framework for offloading thread computation data processing in accordance with the present disclosure.

FIG. 2 illustrates another exemplary framework 200 for offloading thread computation data processing in accordance with the present disclosure. The framework 200 includes a host 202 and a computational storage 204. The host 202 may include a CPU 203 and a dynamic random-access memory (DRAM) 205. As used herein, DRAM refers to a type of random-access semiconductor memory that stores each bit of data in a memory cell, usually consisting of a tiny capacitor and a transistor, both typically based on metal-oxide-semiconductor (MOS) technology. The computational storage 204 may include a persistent memory 212. As used herein, persistent memory (e.g., persistent storage) refers to any data storage device that retains data after power to that device is shut off. It is also sometimes referred to as non-volatile storage. The computational storage 204 may also include a DRAM 207 (or, alternatively, it is possible to use other various types of NVM memory, such as fast NVM memory instead of DRAM).

In embodiments, the CPU 203 on the host side may execute processes 206a-n, and execution of the threads 208a-n may be orchestrated in computational storage 204. In other words, processes on the host side may create threads to execute computation on the storage device side. As a result, data may be processed inside of the computational storage 204 without data needing to be moved between DRAM 205 of the host 202 and the persistent memory 212 of the computational storage 204. If data is processed inside of the computational storage 204, the CPU 203 may not need to spend resources on such data processing. Instead, the CPU 203 may be able to use more resources to increase the performance of the process execution.

In embodiments, the threads 208a-n can be executed in a massively parallel manner. For example, the threads 208a-n may each be distributed to their own computational core 210a-n. If the threads 208a-n can be executed in a massively parallel manner, the overall performance of data processing may be improved and/or accelerated. Because extensive amounts of data do not need to be exchanged between the host 202 and the computational storage 204, overall power consumption may be decreased. For example, energy may be saved due to data being kept in persistent memory 212 of the computational storage 204, rather than in DRAM 205 of the host 202 that is very power hungry, before and during data processing. Energy may also be saved because data and/or code does not need to be kept in power-hungry SRAM (CPU L1/L2/L3 caches). Additionally, energy may be saved because executable cores 210a-n of the computational storage 204 may be simpler and more power efficient than power-hungry CPU cores.

The processes 206a-n on the host side only need to retrieve the result of data processing performed by the computational storage 204 if the host 202 needs to represent some results to a user. In certain embodiments, the result of computation may not need to be retrieved from the computational storage 204 by the host 202. For example, the results may not need to be retrieved but instead may be sent to another host by means of a network. In other words, the results of computation may be sent by the computational storage 204 to another host bypassing the host 202.

Generally, a compiler on the host side may prepare all necessary logic to execute an application. An application may be associated with source code that includes a set of functions. For example, a compiler on the host side may generate a compilation of source code associated with the application and convert it into executable binaries. Then, these binaries may be stored into a persistent memory of a storage device. In some examples, if the storage device has computational power (e.g., computational storage 204), a compiler (e.g., Just-in-Time (JIT) compiler) on the storage device side may additionally or alternatively be configured to perform some or all of the compilation.

In embodiments, the compiler may distribute the set of functions associated with an application amongst threads and compile thread logic as a library. For example, the compiler may be configured to distribute the logic of application execution between the host and the computational storage. The logic of the host may be represented by management threads and the logic of computational storage may be represented by libraries. Each library can be represented as an independent file. The management threads may request the libraries to be pre-fetched and executed by the computational storage.

In embodiments, each thread (e.g., threads 208a-n) may execute a function that defines the logic of the thread execution. Such logic may include one or more data transformation activities that can be executed independently from other threads. However, execution of any function associated with an application may depend on one or more other functions associated with the application. Thus, thread execution logic may be offloaded into a computational storage because NVM memory may be used to exchange data amongst threads.

Figure 3:
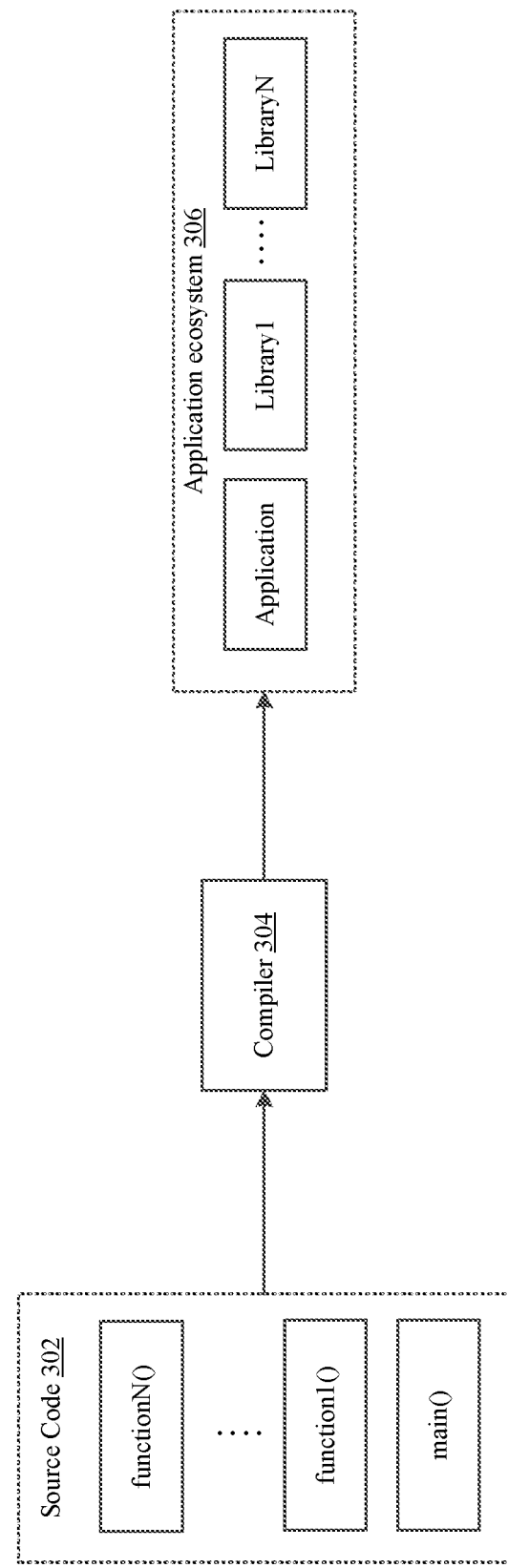
FIG. 3 illustrates another exemplary framework for compiling thread logic as a library in accordance with the present disclosure.

FIG. 3 illustrates an exemplary framework 300 for compiling thread logic as libraries in accordance with the present disclosure. The framework 300 includes source code 302, a compiler 304, and an application ecosystem 306. The source code 302 may include a set of functions (function1 ( ) . . . functionN( )) associated with the application. The compiler 304 may distribute the functions included in the set of functions amongst threads and compile the thread logic as libraries. The application ecosystem 306 may include a plurality of libraries (Library1, . . . , LibraryN). Each library may be represented as an independent file.

In embodiments, an application start may involve the moving of an initial process image on host side, the preparation of the process environment, and the starting of the main logic execution. For example, when a user requests to start an application, the user may provide the name and the path of the executable file. First, the operating system (OS) may perform the fork operation. The fork operation involves the copying of an image of any existing process inside of the DRAM memory. Then, the OS may read (e.g., pre-fetch) the content of the executable file from the persistent memory into DRAM (e.g., prepared space). Finally, the OS may start the execution of the prepared process from the first instruction of the main function of the application.

All libraries may not need to be moved on the host side because the storage device may use the library executable code for execution of the functions' logic and processing data on the storage device side. In certain embodiments, the host and the storage device may use different architectures. For example, Intel CPU may be used on the host side and ARM/RISC-V core(s) may be used on the storage device side. As a result, the compiler may build the application's executable image for the host architecture (e.g., Intel platform), but the libraries may be built for the storage device architecture (e.g., ARM/RISC-V platform).

In embodiments, thread start on the computational storage side may resemble a library pre-loading technique. However, code that is pre-loaded always works on the computational storage side. Starting an application implies the creation and execution of a process image on host side. Libraries' logic can be pre-loaded on the computational storage side and may thus be ready for execution because the process has dependencies with libraries.

Figure 4:
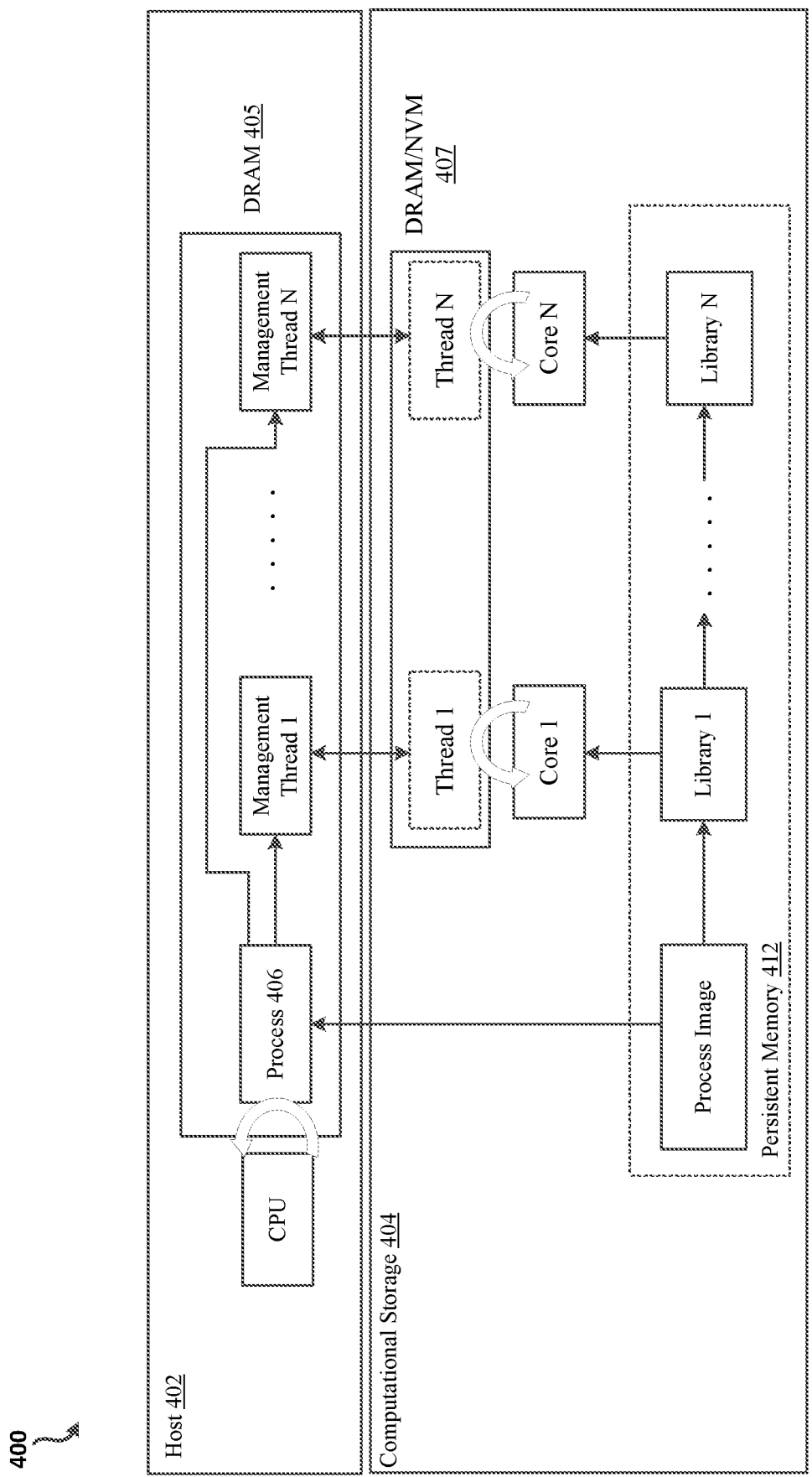
FIG. 4 illustrates another exemplary framework for offloading thread computation data processing in accordance with the present disclosure.

FIG. 4 illustrates another exemplary framework 400 for offloading thread computation data processing in accordance with the present disclosure. The framework 400 includes a host 402 and a computational storage 404 including persistent memory 412. An application may be started. As discussed above, starting the application may involve a request to prepare an execution environment on the computational storage 404 by means of pre-loading libraries' logic in the persistent memory 412 and preparing hardware threads for data processing on the computational storage side. In certain embodiments, the process 406 may need to start management threads (e.g., Management Threads 1-N) on the host side, such as in a DRAM 405. The responsibility of the management threads may be to request and/or manage the computation threads (e.g., threads 1-N) on the computational storage side, such as a DRAM 407. To do so, the management threads may issue computational request(s) to the computational storage 404, and then the management threads may go to sleep until being woken up by receiving the result of computation from the computational storage 404. The management threads may additionally, or alternatively, use a polling to track and orchestrate the activity of the computation threads on the storage device side. Management of the computation threads by the management threads is discussed in more detail below.

Figure 5:
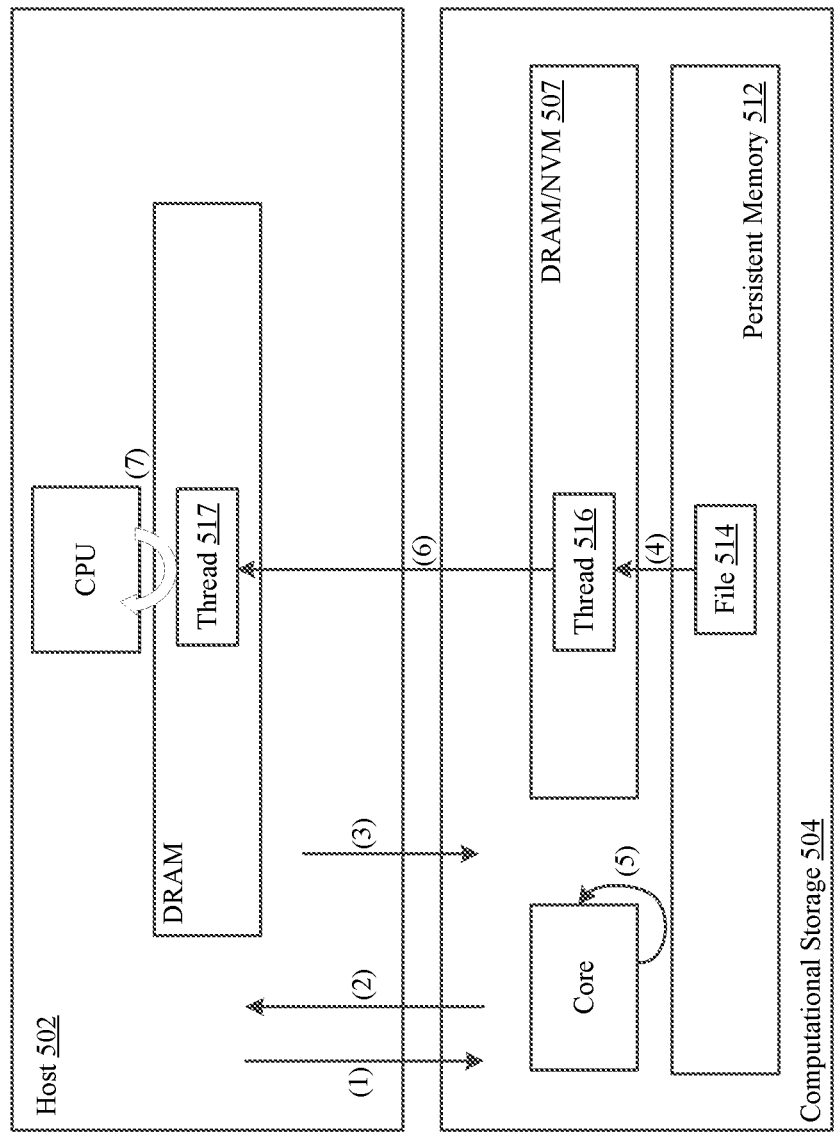
FIG. 5 illustrates another exemplary framework for offloading thread computation data processing in accordance with the present disclosure.

FIG. 5 illustrates another exemplary framework 500 for offloading thread computation data processing in accordance with the present disclosure. Any executable code (applications and/or libraries) may be stored into a storage device as binary files 514. If an application starts, at numeral 1, the host 502 may check whether the storage device represents a computational storage 504. At numeral 2, the host may receive confirmation that the storage device is the computational storage 504. If the host 502 receives confirmation that the storage device is computational storage, the host 502 may, at numeral 3, request for the creation of a plurality of computation threads in the computational storage 504. For example, the application's logic may request computation thread creation (by means of specialized I/O request, for example).

In embodiments, the plurality of computation threads may be created based on preloading a plurality of libraries in the storage device. The plurality of libraries may comprise executable codes associated with the plurality of threads. For example, at numeral 4 of the example of FIG. 5, the executable binary file 514 may be pre-loaded into the DRAM and/or byte-addressable NVM memory 507. The application may pre-load all libraries before the real execution as a part of the application start. Additionally, or alternatively, the libraries may be pre-loaded at the time of a particular function call. At numeral 5, the computation thread(s) 516 may be created by the core(s) of the computational storage 504. In an example, a number of the computation thread(s) 516 may be the same as that of the management thread(s) on the host side.

In embodiments, the computational storage 504 may need to identify the code location in the main portion of persistent memory 512 (e.g., NAND flash). In certain embodiments, the executable code can be accessed in the persistent memory during execution (for example, NOR flash or MRAM memory can implement XiP approach). However, if such code execution is not available (NAND flash), the code may need to be pre-loaded into another type of memory. The other type of memory may be, for example, another type of NVM memory (e.g., NOR flash, MRAM, ReRAM, etc.) or DRAM memory. Finally, at numeral 6, the computational storage 504 may inform the host 502 that the computation thread 516 is created and is ready for execution. For example, the computational storage 504 may inform a management thread 517 that the computation thread 516 is created and is ready for execution.

In embodiments, the main logic of the application on host side can orchestrate computation threads activity on the storage device side, or it can create dedicated management threads. At numeral 7, management threads may be created on the host side. These management threads on the host side can orchestrate the activity of the computation threads in the storage device. Because user data is stored in the persistent memory 512 of computational storage 504, the computation threads 516 can access and process data on the storage device side without moving data onto the host side for processing. As a result, data processing performance may be improved and accelerated, and the latency of data-intensive applications may be decreased.

In embodiments, any particular function may be applied on multiple data sets. A management thread on the host side may need to define the location of data that the computation thread needs to process at a particular time point. A journaling technique may be used to manage the computation thread activity on the storage device side. The host may be focused on preparing request queues. However, the actual data processing may happen on the storage device side in massively parallel manner. This technique may significantly improve and accelerate the performance of data processing and decrease power consumption.

Figure 6:
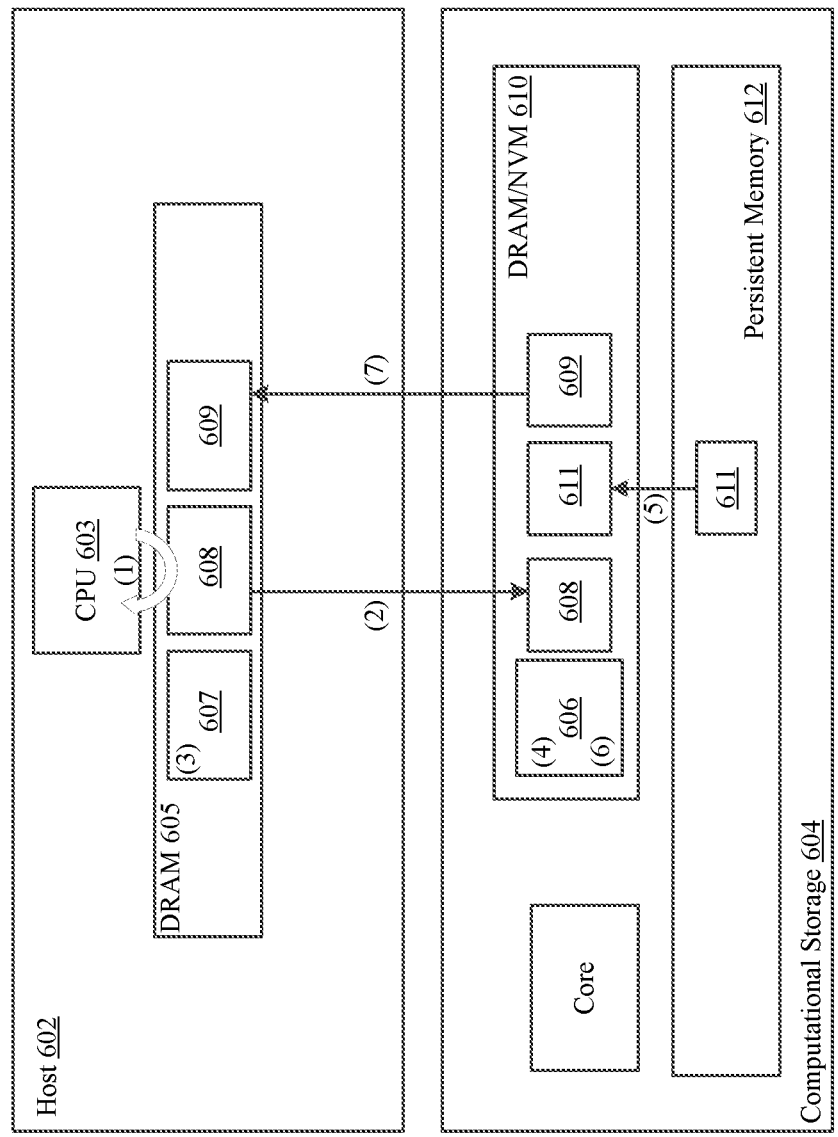
FIG. 6 illustrates another exemplary framework for offloading thread computation data processing in accordance with the present disclosure.

FIG. 6 illustrates another exemplary framework 600 for offloading thread computation data processing in accordance with the present disclosure. The framework 600 includes a host 602 and a computational storage 604 including a persistent memory 612. The host 602 may include a CPU 603 and a DRAM 605. The host 602 may start management thread(s) 607 and flush journal(s) 608 to the computational storage 604. The computational storage 604 may comprise a DRAM/NVM memory 610 and a persistent memory 612. The computation thread(s) 606 in the DRAM/NVM memory 610 may have the same number as the management thread(s) 607 on the host side. Processing data 611 may be pre-fetched from the persistent memory 612 to the DRAM/NVM memory 610. The computation result(s) 609 may be sent back to from the computational storage 604 to the host 602.

The computation thread activity on the side of computation storage 604 may be managed using journaling techniques. For example, the management thread(s) 607 on the host side can define a user data location by defining logical block addressing (LBA) numbers that need to be processed by the computation thread(s) 606 on the side of computation storage 604. Thus, a sequence or queue of requests may exist for every computation thread on the side of the computational storage 604. The management thread(s) 607 on the side of the host 602 can prepare the request (e.g., journal transaction) including the definition of the LBA range(s). The management thread(s) 607 may cause the request or transaction to be stored into a queue corresponding to the proper computation thread on the side of the computational storage 604.

For example, at numeral 1, the host 602 may prepare journal transaction(s) in a journal 608. For example, the CPU 603 of the host 602 may prepare the journal transaction(s). At numeral 2, the host 602 may send a computation request to the computational storage 604. The computation request may be sent by flushing journal transaction(s) by means of I/O requests or by flushing the journal at first by special I/O request(s) and then initiating another I/O computation request after finishing flushing the journal I/O request(s). For example, the management thread(s) 607 on the host side may send I/O request(s) to the DRAM/NVM 610 of the computational storage 604.

In embodiments, after the management thread has sent the request to offload computation to the computational storage 604, the management thread may poll the state of the computation activity in computational storage 604. In other embodiments, after the management thread has sent the request to offload computation to the computational storage 604, the management thread may execute some other computation until the computation activity is finished in the computational storage 604. In some embodiments, after the management thread has sent the request to offload computation to the computational storage 604, the management thread may go to sleep until the computational activity is finished in the computational storage 604. For example, the management thread may go to sleep until the computational activity is finished in the computational storage 604 if there is no other computation activity. At numeral 3, the management thread 607 as a task may go to sleep. If the management thread 607 as a task goes to sleep, the task may not receive time slices of CPU 603 until the management thread is woken up.

After the management thread as a task goes to sleep, the computation threads may be woken up. At numeral 4, the computation thread 606 may be woken up. After being woken up, the computation thread 606 may process the journal transaction(s). To process the journal transaction(s), at numeral 5, the computation thread may pre-fetch processing data 611. At numeral 6, the computation thread 606 may execute requested computation. For example, the computation thread 606 may execute the algorithm logic. The computation thread may execute one or more steps of the algorithm logic. Alternatively, the computation thread may execute the entire algorithm logic. After the computation thread has executed the request, at numeral 7, the computation thread may return the result of the execution back to the host 602. For example, the computation thread may return the result 609 of the I/O request, including information such as the status of the operation and/or the result payload. After returning the result, the computation thread may extract another request and repeat the process. Alternatively, the computation thread may go to sleep if the journal area is empty. Thus, the computation thread may implement data processing by means of executing requests from the journal area. In embodiments, the management thread's logic may be woken up and the logic may continue if the result of the data processing is present.

Figure 7:
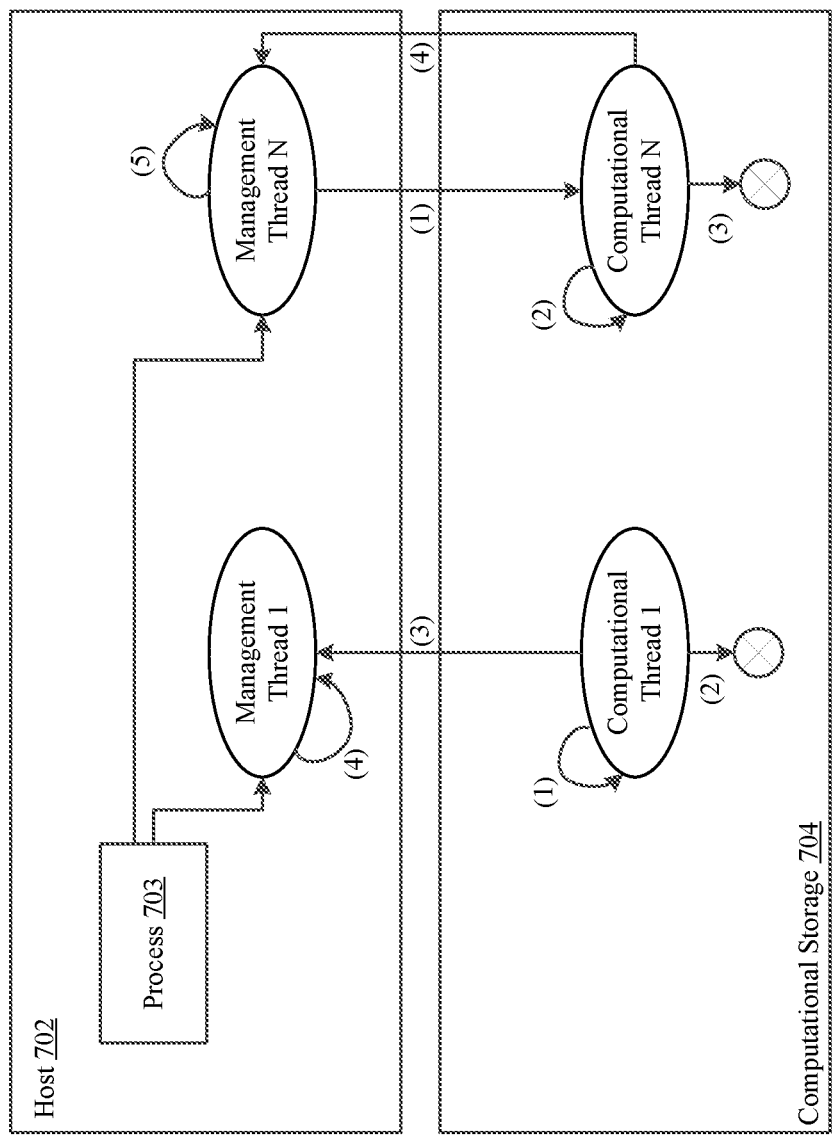
FIG. 7 illustrates an example framework for thread management in accordance with the present disclosure.

In embodiments, every application has to be properly terminated in the case of user request and/or in case of any possible issue with execution. FIG. 7 illustrates an example framework 700 for thread management in accordance with the present disclosure. The framework 700 includes a host 702 and a computational storage 704. To terminate an application, the process 703 may issue a termination command or a termination request to all computation threads in computational storage 704.

In response to receiving the termination command or termination request, the management thread on host side can issue an I/O request for the computation thread(s) on the computational storage side to finish execution. For example, at numeral 1 in the example of FIG. 7, Management Thread N may send a request to Computation Thread N to terminate. In response to receiving the request to terminate, at numeral 2, Computation Thread N may execute a termination logic or a destruction logic and free resources. At numeral 3, Computation Thread N may terminate. Finally, at numeral 4, the computational storage 704 may return the termination status of destroyed Computation Thread N to Management Thread N on the host side. As a result, at numeral 5, all threads, such as Management Thread N, will be terminated and process 703 may finish the execution.

In certain embodiments, the behavior of computation thread depends on execution logic. Some computation threads can be terminated after finishing the algorithm's logic. For example, such computation threads may be terminated on the computational storage side. At numeral 1 in the example of FIG. 7, Computation thread 1 may detect an error or logic end. At numeral 2, in response to detecting the error or logic end, Computation thread 1 may execute the destruction logic. After executing the destruction logic, at numeral 3, Computation thread 1 may return a termination status of terminated Computation thread 1 to Management Thread 1 on the host side. At numeral 4, Management Thread 1 may be terminated.

A zombie thread is a thread that has both terminated its execution and has been removed from the list of scheduled processes but has not yet been deleted. Zombie threads are not uncommon because some applications/threads may crash or malfunction. Thus, computation storage may continue to execute zombie thread(s) for crashed management threads. Additionally, a quantity of computation threads may sometimes be greater than a quantity of the processing cores on the computational storage side. If a quantity of computation threads is greater than a quantity of the processing cores on the computational storage side, the computation threads may share the processing cores. In embodiments, a computational storage can use its persistent memory as a swap space to keep the image of computation thread awaiting execution time slices. Every computation thread's image can be associated with timestamp (and/or any other metadata) that is stored during the swapping of the sleeping thread image. Thus, the timestamps of sleeping threads may be checked and used to detect zombie threads if the timestamp is too old. Detected zombie threads may be destroyed. For example, a garbage collector subsystem of the computation storage can detect and destroy zombie threads.

Figure 8:
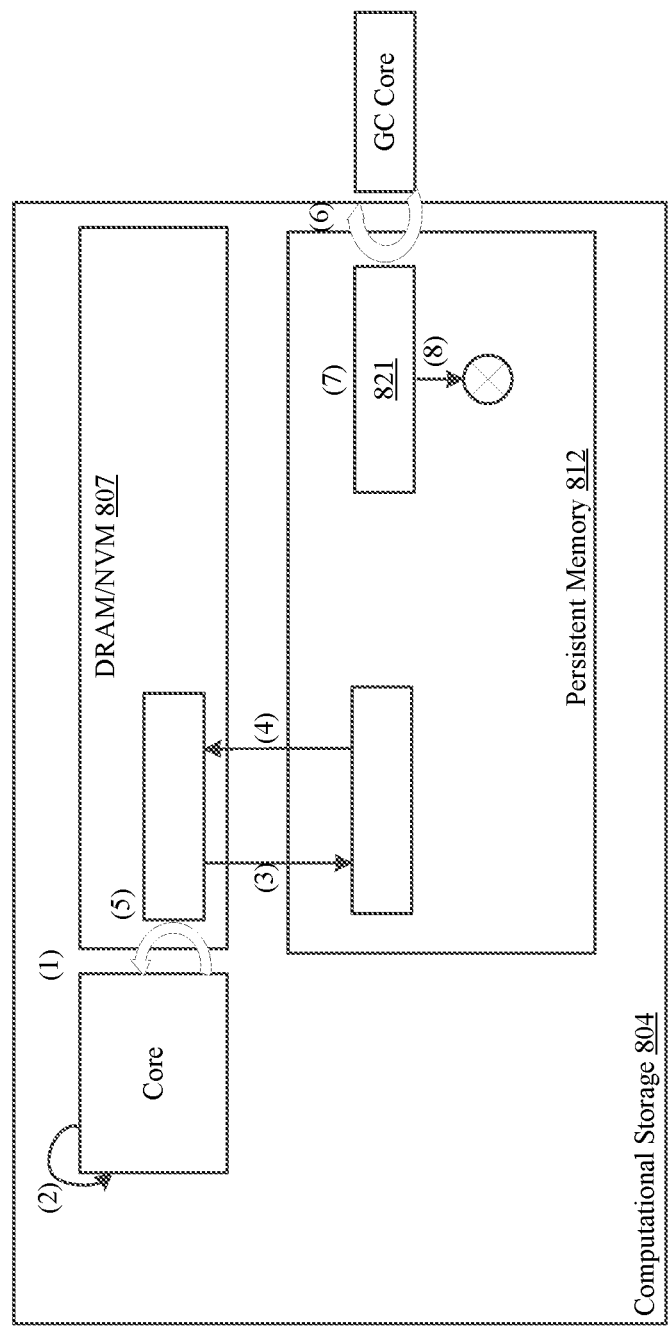
FIG. 8 illustrates another example framework for thread management in accordance with the present disclosure.

FIG. 8 illustrates another example framework 800 for thread management in accordance with the present disclosure. The framework 800 includes a computational storage 804. The computational storage 804 includes a persistent memory 812 and a DRAM/NVM 807.

A regular (e.g., non-zombie) computation thread may be managed. For example, at numeral 1, the algorithm's logic associated with the computation thread may finish. At numeral 2, the computation thread may be prepared to a sleeping state based on detecting a logic end associated with the thread. The computational storage 804 can use the persistent memory 812 like a swap space to keep the image of computation thread that is awaiting execution time slices. Every computation thread's image can be associated with timestamp (and/or any other metadata) that is stored during the swapping of the sleeping thread image. At numeral 3, an image of the computation thread and a timestamp associated with the image may be stored to a swapping space in the persistent memory 812. At numeral 4, the image of the computation thread may be loaded to the DRAM or byte-addressable NVM 807 and execution of the computation thread may be restored based at least in part on the timestamp. At numeral 5, execution of the computation thread may be continued.

In some embodiments, a zombie computation thread 821 may be terminated. At numeral 6, a current timestamp may be calculated. At numeral 7, a timestamp associated with the image of the thread 821 in the swapping space may be checked. It may be determined whether the difference between the current timestamp and the timestamp associated with the image of the thread 821 is greater than a predetermined threshold. If it is determined that the difference between the current timestamp and the timestamp associated with the image of the thread 821 is greater than the predetermined threshold, the thread image may be deleted. At numeral 8, the thread image may be deleted.

In embodiments, a computation thread logic may contain bugs and/or synchronization issues. As a result, a computation thread on the storage device side may experience issues. For example, a computation thread on the storage device side may experience issues such as an infinite loop or a deadlock. As a result of such issues, the computation thread may never finish execution. Additionally, or alternatively, such issues may cause the computation thread to waste the computational resources of computational storage. To avoid these negative effects, management threads on the host side may use a polling technique to check the execution status of computation threads. If a management thread does not receive an answer from a computation thread or if a computation thread is still under execution after a certain amount of time has elapsed, then the management thread may request termination of the computation thread by the computational storage. For example, if the management thread has received no answer or if the computational thread is still under execution after achieving a time threshold, then the management thread can request termination of computational thread by a garbage collector subsystem of the computational storage.

Figure 9:
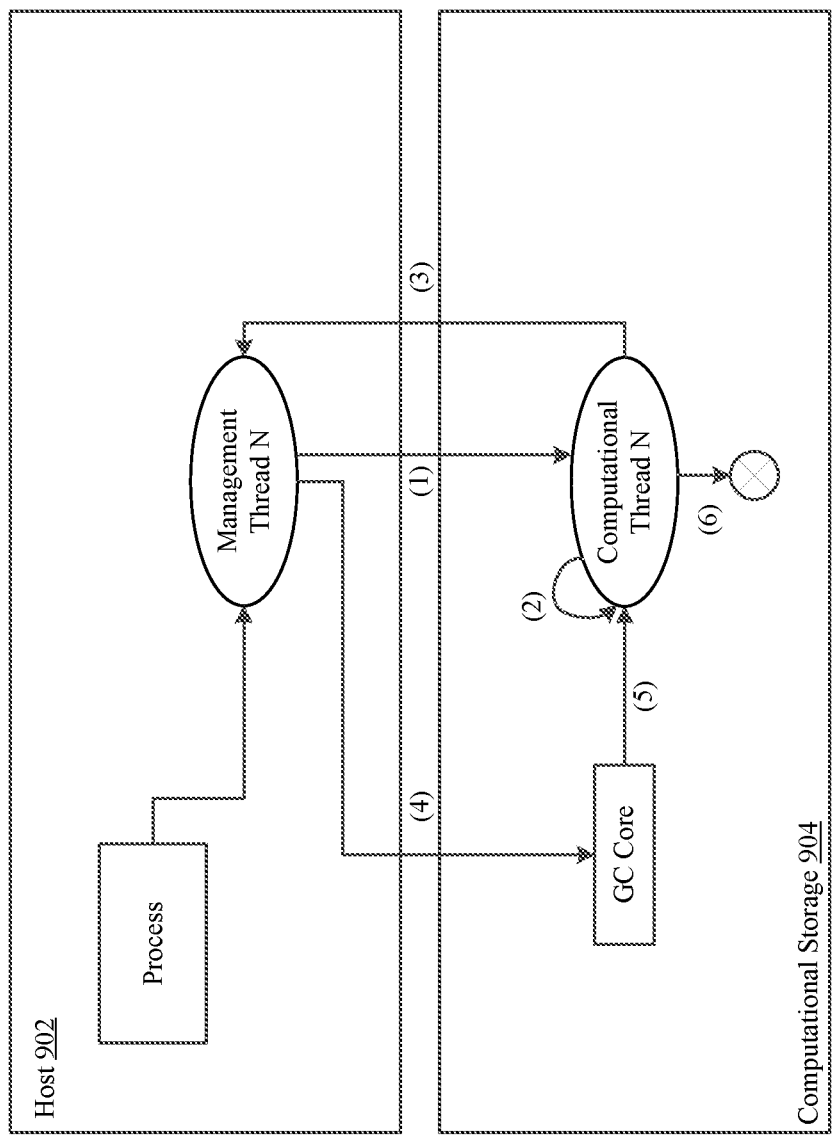
FIG. 9 illustrates another example framework for thread management in accordance with the present disclosure.

FIG. 9 illustrates another example framework 900 for thread management in accordance with the present disclosure. The framework 900 includes a host 902 and a computational storage 904. Management Thread N on the side of the host 902 may use a polling technique to check the execution status of Computation thread N on the side of computational storage 904. For example, at numeral 1, Management Thread N may request a computation activity associated with Computation thread N. The logic of Computation thread N may contain bugs and/or synchronization issues. As a result, Computation thread N may experience issues, such as an infinite loop or a deadlock. At numeral 2, Computation thread N may experience a deadlock or an infinite loop. At numeral 3, Management Thread N may poll Computation thread N. If Management Thread N does not receive an answer from Computation thread N or if Computation thread N is still under execution after a certain amount of time has elapsed, then Management Thread N may request termination of Computation thread N by the computational storage 904. At numeral 4, Management Thread N may request that Computation thread N be destroyed by the GC subsystem. At numeral 5, the GC subsystem may check Computation thread and initiate the termination of Computation thread N. At numeral 6, Computation thread N may be terminated.

Figure 10:
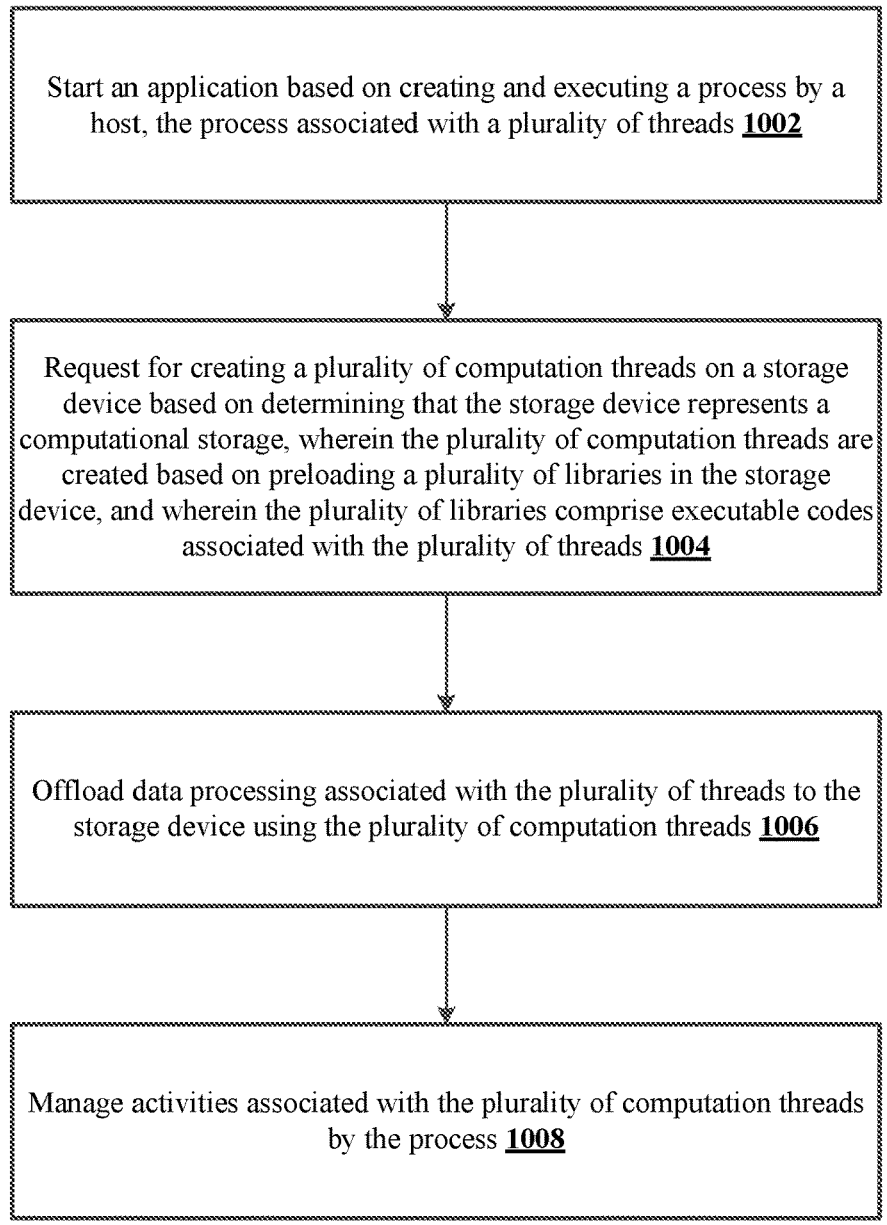
FIG. 10 illustrates an example process for accelerating data processing in accordance with the present disclosure.

FIG. 10 illustrates an example process 1000 for accelerating data processing in accordance with the present disclosure. For example, the process 1000 may be performed, at least in part, by a framework for data processing using a computational storage. Although depicted as a sequence of operations in FIG. 10, those of ordinary skill in the art will appreciate that various embodiments may add, remove, reorder, or modify the depicted operations.

At 1002, an application may be started based on creating and executing a process by a host. The process may be associated with a plurality of threads. For example, starting the application may comprise the moving of an initial process image on host side. When a user requests to start an application, the user may provide the name and the path of the executable file. The OS may perform the fork operation. The fork operation involves the copying of an image of any existing process inside of the DRAM memory.

It may be determined that a storage device represents a computational storage. At 1004, creating a plurality of computation threads on the storage device may be requested based on determining that the storage device represents a computational storage. The plurality of computation threads may be created based on preloading a plurality of libraries in the storage device. The plurality of libraries may comprise executable codes associated with the plurality of threads. For example, executable binary files may be pre-loaded into a DRAM of the storage device. All libraries may be pre-loaded before the real execution as a part of the application start. Additionally, or alternatively, the libraries may be pre-loaded at the time of a particular function call.

The completion of the pre-load operation may indicate that the creation of the thread image is ready for execution in computational storage. The computational storage may inform the host that the computation threads are created and ready for execution. At 1006, data processing associated with the plurality of threads may be offloaded to the storage device using the plurality of computation threads.

At 1008, activities associated with the plurality of computation threads may be managed by the process. For example, management threads associated with the process may be to request and/or manage the plurality of threads on the computational storage side. To do so, the management threads may issue computational request(s) to the computational storage, and then the management threads may go to sleep until being woken up by receiving the result of computation from the computational storage. The management threads may additionally, or alternatively, use a polling to track and orchestrate the activity of the plurality of threads on the storage device side. Because data is stored in storage device, the computation threads can access and process data on the storage device side without moving data onto the host side for processing. As a result, data processing performance may be improved and accelerated, and the latency of data-intensive applications may be decreased.

FIG. 11 illustrates an example process 1100 for accelerating data processing in accordance with the present disclosure. For example, the process 1100 may be performed, at least in part, by a framework for data processing using a computational storage. Although depicted as a sequence of operations in FIG. 11, those of ordinary skill in the art will appreciate that various embodiments may add, remove, reorder, or modify the depicted operations.

At 1102, an application may be started based on creating and executing a process by a host. The process may be associated with a plurality of threads. For example, starting the application may comprise the moving of an initial process image on host side. When a user requests to start an application, the user may provide the name and the path of the executable file. The OS may perform the fork operation. The fork operation involves the copying of an image of any existing process inside of the DRAM memory.

It may be determined that a storage device represents a computational storage. At 1104, creating a plurality of computation threads on the storage device may be requested based on determining that the storage device represents a computational storage. The plurality of computation threads may be created based on preloading a plurality of libraries in the storage device. The plurality of libraries may comprise executable codes associated with the plurality of threads. For example, executable binary files may be pre-loaded into a DRAM of the storage device. All libraries may be pre-loaded before the real execution as a part of the application start. Additionally, or alternatively, the libraries may be pre-loaded at the time of a particular function call.

The completion of the pre-load operation may indicate that the creation of the thread image is ready for execution in computational storage. The computational storage may inform the host that the computation threads are created and ready for execution. At 1106, the plurality of computation threads may be executed on at least a portion of data in a massively parallel manner. The data may be stored on the storage device, such as in a persistent memory of the storage device. For example, the computation threads may each be distributed to their own CPU core so that they can be executed in a massively parallel manner. As a result, the overall performance of data processing may be improved and/or accelerated. Because extensive amounts of data do not need to be exchanged between the host and the computational storage, overall power consumption may be decreased. The process on the host side only needs to retrieve the result of data processing performed by the computational storage.

Figure 12:
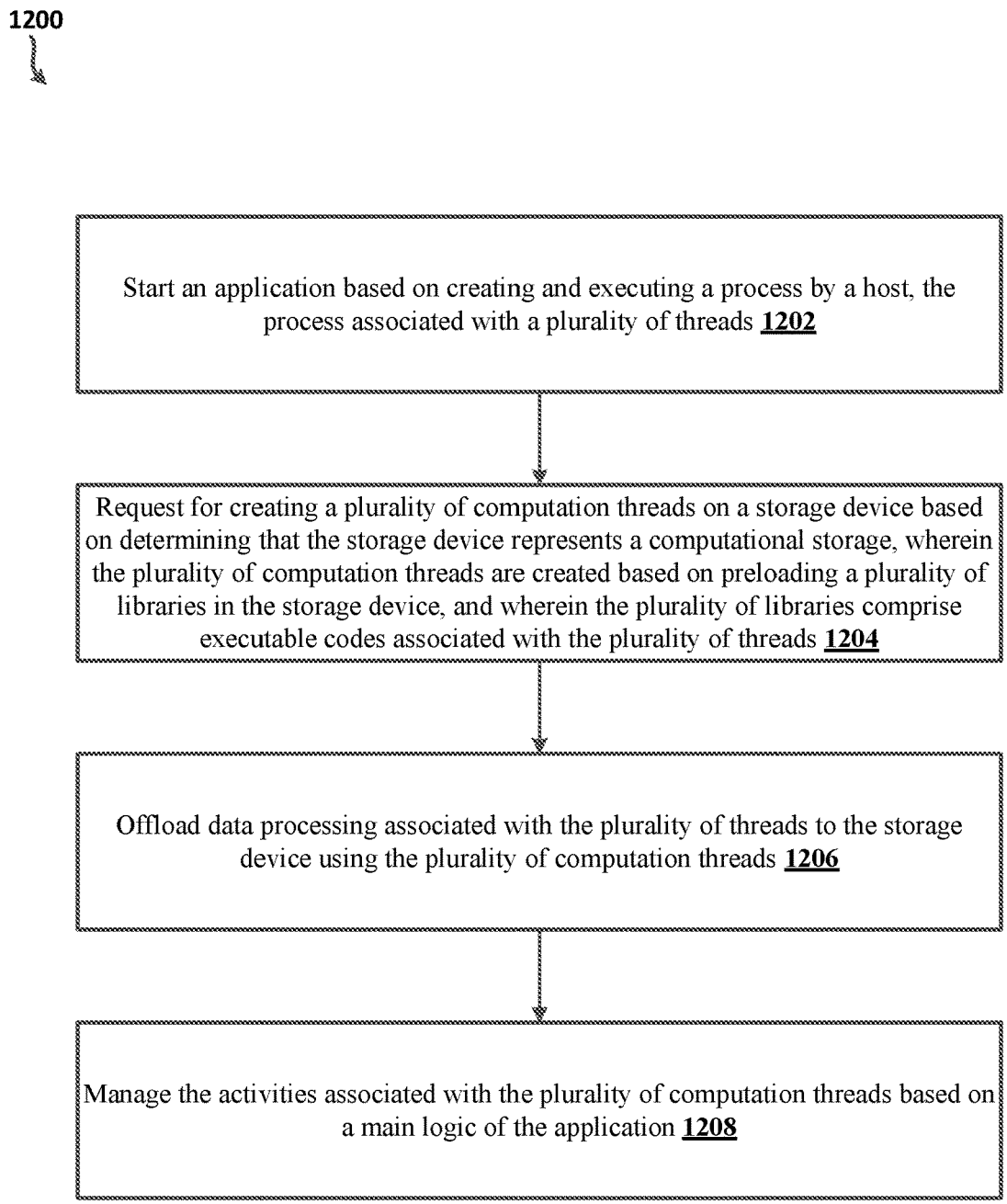
FIG. 12 illustrates another example process for accelerating data processing in accordance with the present disclosure.

FIG. 12 illustrates an example process 1200 for accelerating data processing in accordance with the present disclosure. For example, the process 1200 may be performed, at least in part, by a framework for data processing using a computational storage. Although depicted as a sequence of operations in FIG. 12, those of ordinary skill in the art will appreciate that various embodiments may add, remove, reorder, or modify the depicted operations.

At 1202, an application may be started based on creating and executing a process by a host. The process may be associated with a plurality of threads. For example, starting the application may comprise the moving of an initial process image on host side. When a user requests to start an application, the user may provide the name and the path of the executable file. The OS may perform the fork operation. The fork operation involves the copying of an image of any existing process inside of the DRAM memory.

It may be determined that a storage device represents a computational storage. At 1204, creating a plurality of computation threads on the storage device may be requested based on determining that the storage device represents a computational storage. The plurality of computation threads may be created based on preloading a plurality of libraries in the storage device. The plurality of libraries may comprise executable codes associated with the plurality of threads. For example, executable binary files may be pre-loaded into a DRAM of the storage device. All libraries may be pre-loaded before the real execution as a part of the application start. Additionally, or alternatively, the libraries may be pre-loaded at the time of a particular function call.

The completion of the pre-load operation may indicate that the creation of the thread image is ready for execution in computational storage. The computational storage may inform the host that the computation threads are created and ready for execution. At 1206, data processing associated with the plurality of threads may be offloaded to the storage device using the plurality of computation threads.

In embodiments, the main logic of the application can orchestrate computation threads activity on the storage device side. At numeral 1208, the activities associated with the plurality of computation threads may be managed based on a main logic of the application. For example, the main logic of the application may orchestrate the activity of the computation threads in the storage device. Because user data is stored in the persistent memory of computational storage, the computation threads can access and process data on the storage device side without moving data onto the host side for processing. As a result, data processing performance may be improved and accelerated, and the latency of data-intensive applications may be decreased.

Figure 13:
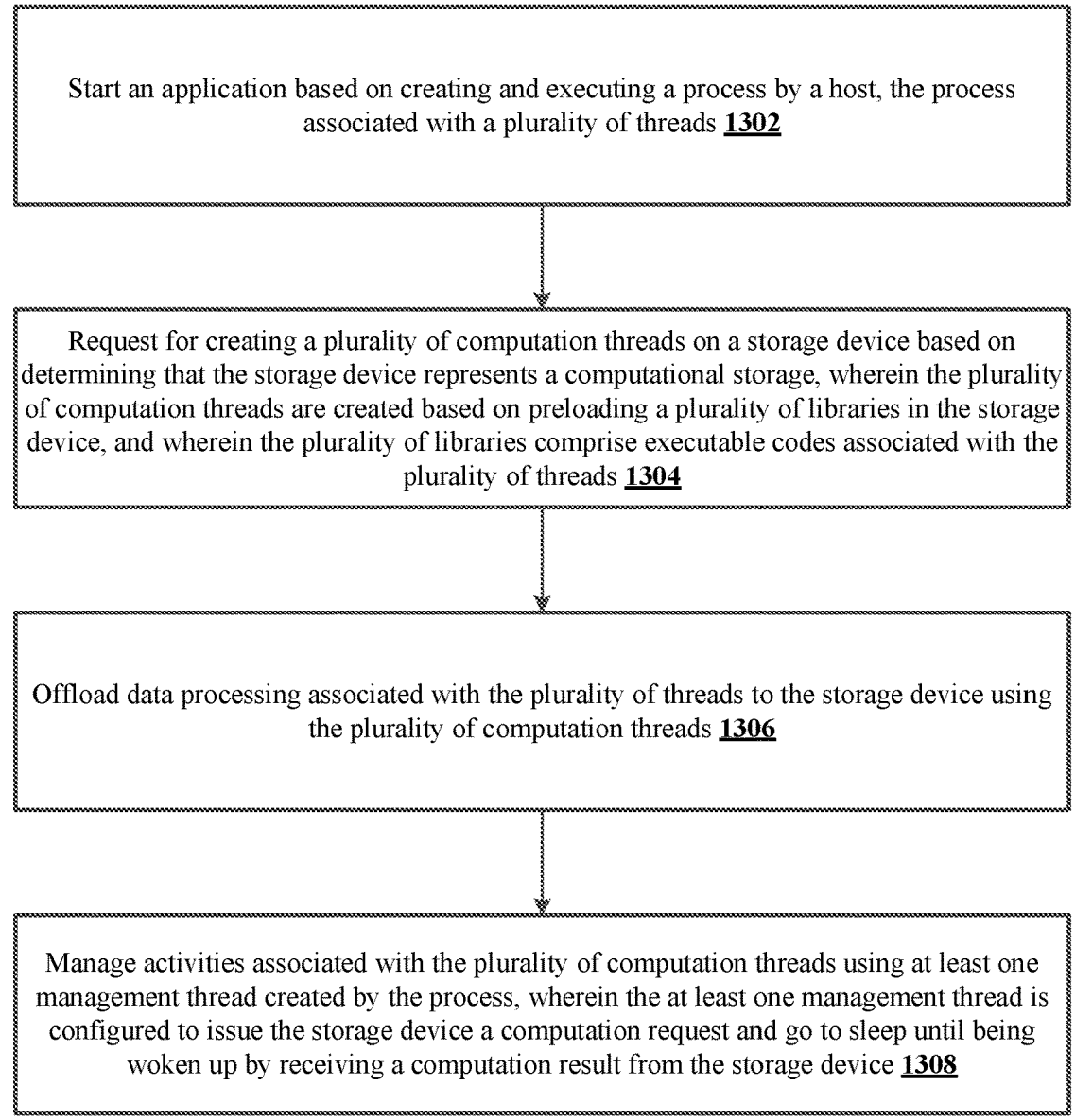
FIG. 13 illustrates another example process for accelerating data processing in accordance with the present disclosure.

FIG. 13 illustrates an example process 1300 for accelerating data processing in accordance with the present disclosure. For example, the process 1300 may be performed, at least in part, by a framework for data processing using a computational storage. Although depicted as a sequence of operations in FIG. 13, those of ordinary skill in the art will appreciate that various embodiments may add, remove, reorder, or modify the depicted operations.

At 1302, an application may be started based on creating and executing a process by a host. The process may be associated with a plurality of threads. For example, starting the application may comprise the moving of an initial process image on host side. When a user requests to start an application, the user may provide the name and the path of the executable file. The OS may perform the fork operation. The fork operation involves the copying of an image of any existing process inside of the DRAM memory.

It may be determined that a storage device represents a computational storage. At 1304, creating a plurality of computation threads on the storage device may be requested based on determining that the storage device represents a computational storage. The plurality of computation threads may be created based on preloading a plurality of libraries in the storage device. The plurality of libraries may comprise executable codes associated with the plurality of threads. For example, executable binary files may be pre-loaded into a DRAM of the storage device. All libraries may be pre-loaded before the real execution as a part of the application start. Additionally, or alternatively, the libraries may be pre-loaded at the time of a particular function call.

The completion of the pre-load operation may indicate that the creation of the thread image is ready for execution in computational storage. The computational storage may inform the host that the computation threads are created and ready for execution. At 1306, data processing associated with the plurality of threads may be offloaded to the storage device using the plurality of computation threads.

In embodiments, the main logic of the application may create dedicated management threads. At 1308, the activities associated with the plurality of computation threads may be managed using at least one management thread created by the process. The at least one management thread may be configured to issue the storage device a computation request and go to sleep until being woken up by receiving a computation result from the storage device. Because user data is stored in the persistent memory of computational storage, the computation threads can access and process data on the storage device side without moving data onto the host side for processing. As a result, data processing performance may be improved and accelerated, and the latency of data-intensive applications may be decreased.

Figure 14:
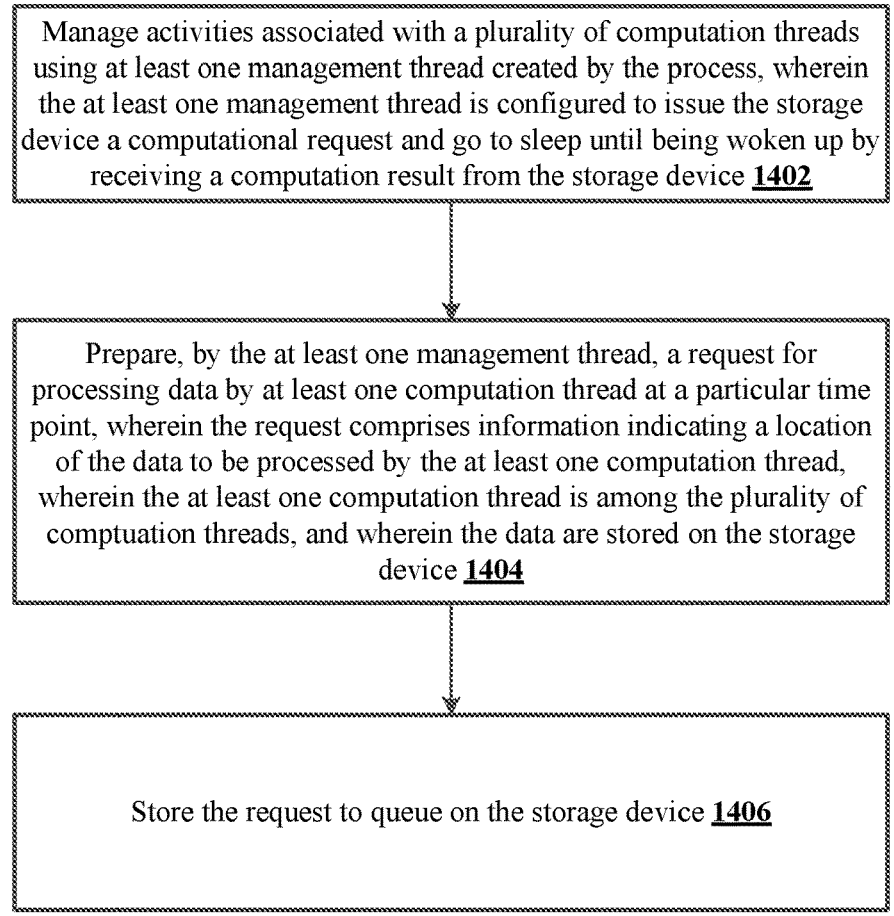
FIG. 14 illustrates another example process for accelerating data processing in accordance with the present disclosure.

FIG. 14 illustrates an example process 1400 for accelerating data processing in accordance with the present disclosure. For example, the process 1400 may be performed, at least in part, by a framework for data processing using a computational storage. Although depicted as a sequence of operations in FIG. 14, those of ordinary skill in the art will appreciate that various embodiments may add, remove, reorder, or modify the depicted operations.

At 1402, the activities associated with a plurality of computation threads may be managed using at least one management thread created by the process. The at least one management thread may be configured to issue the storage device a computational request and go to sleep until being woken up by receiving a computation result from the storage device.

At 1404, the at least one management thread may prepare a request for processing data by at least one computation thread at a particular time point. The request may comprise information indicated a location of data to be processed by the at least one computation thread. The at least one computation thread may be among the plurality of computation threads. The data may be stored on the storage device. At 1406, the request may be stored to a queue on the storage device.

Figure 15:
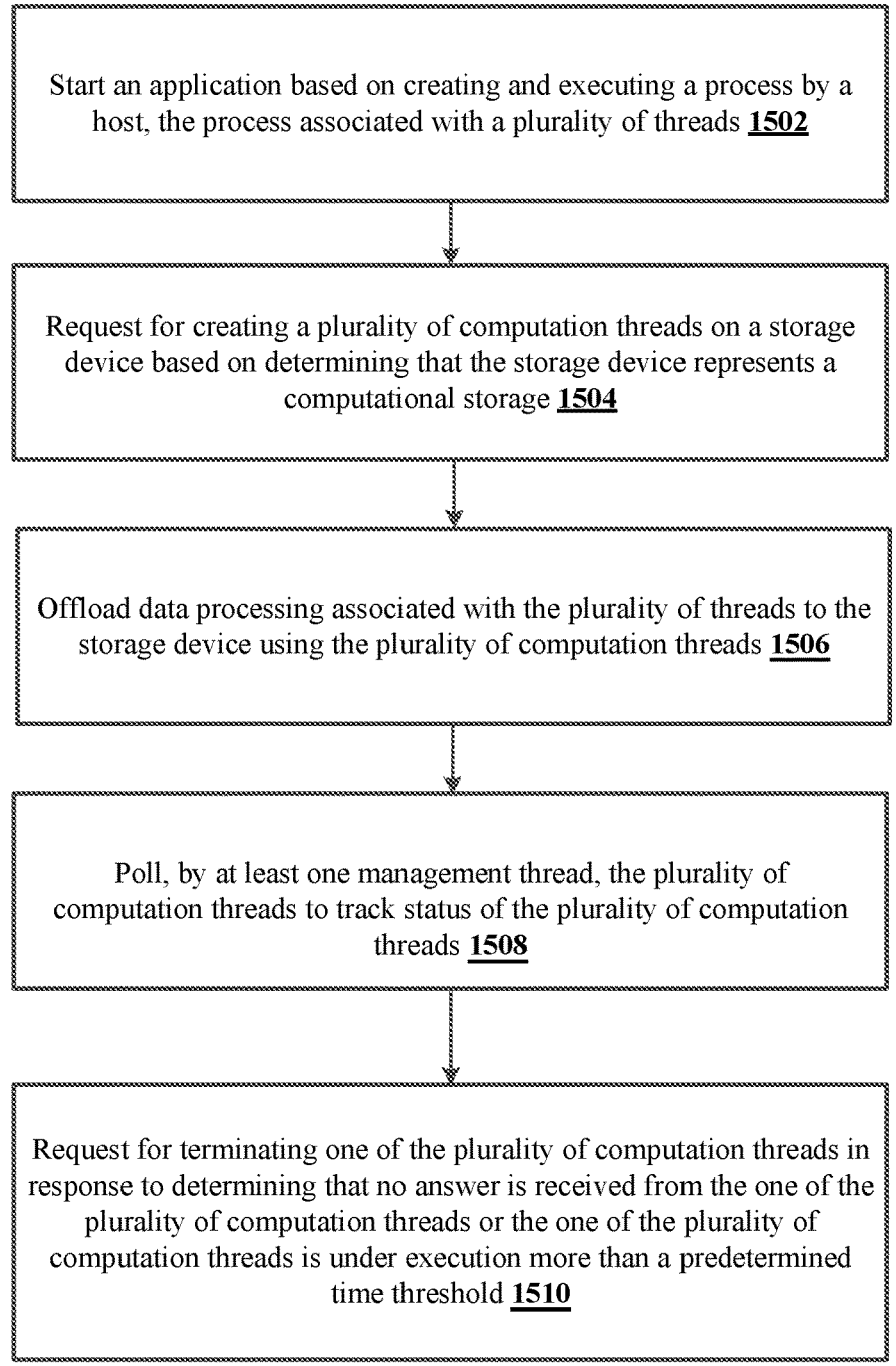
FIG. 15 illustrates another example process for accelerating data processing in accordance with the present disclosure.

FIG. 15 illustrates an example process 1500 for accelerating data processing in accordance with the present disclosure. For example, the process 1500 may be performed, at least in part, by a framework for data processing using a computational storage. Although depicted as a sequence of operations in FIG. 15, those of ordinary skill in the art will appreciate that various embodiments may add, remove, reorder, or modify the depicted operations.

At 1502, an application may be started based on creating and executing a process by a host. The process may be associated with a plurality of threads. For example, starting the application may comprise the moving of an initial process image on host side. When a user requests to start an application, the user may provide the name and the path of the executable file. The OS may perform the fork operation. The fork operation involves the copying of an image of any existing process inside of the DRAM memory.

It may be determined that a storage device represents a computational storage. At 1504, creating a plurality of computation threads on the storage device may be requested based on determining that the storage device represents a computational storage. The plurality of computation threads may be created based on preloading a plurality of libraries in the storage device. The plurality of libraries may comprise executable codes associated with the plurality of threads. For example, executable binary files may be pre-loaded into a DRAM or byte-addressable NVM memory of the storage device. All libraries may be pre-loaded before the real execution as a part of the application start. Additionally, or alternatively, the libraries may be pre-loaded at the time of a particular function call.

The completion of the pre-load operation may indicate that the creation of the thread image is ready for execution in computational storage. The computational storage may inform the host that the computation threads are created and ready for execution. At 1506, data processing associated with the plurality of threads may be offloaded to the storage device using the plurality of computation threads.

In embodiments, a computation thread logic may contain bugs and/or synchronization issues. As a result, a computation thread on the storage device side may experience issues. For example, a computation thread on the storage device side may experience issues such as an infinite loop or a deadlock. As a result of such issues, the computation thread may never finish execution. Additionally, or alternatively, such issues may cause the computation thread to waste the computational resources of computational storage. To avoid these negative effects, management threads on the host side may use a polling technique to check the execution status of computation threads. At 1508, at least one management thread may poll the plurality of computation threads to track status of the plurality of computation threads.

If the at least one management thread does not receive an answer from a computation thread or if a computation thread is still under execution after a certain amount of time has elapsed, then the management thread may request termination of the computation thread by the computational storage. At 1510, terminating of one of the plurality of computation threads may be requested in response to determining that no answer is received from the one of the plurality of the computation threads or that one of the plurality of computation threads is under execution for more than a predetermined time threshold.

Figure 16:
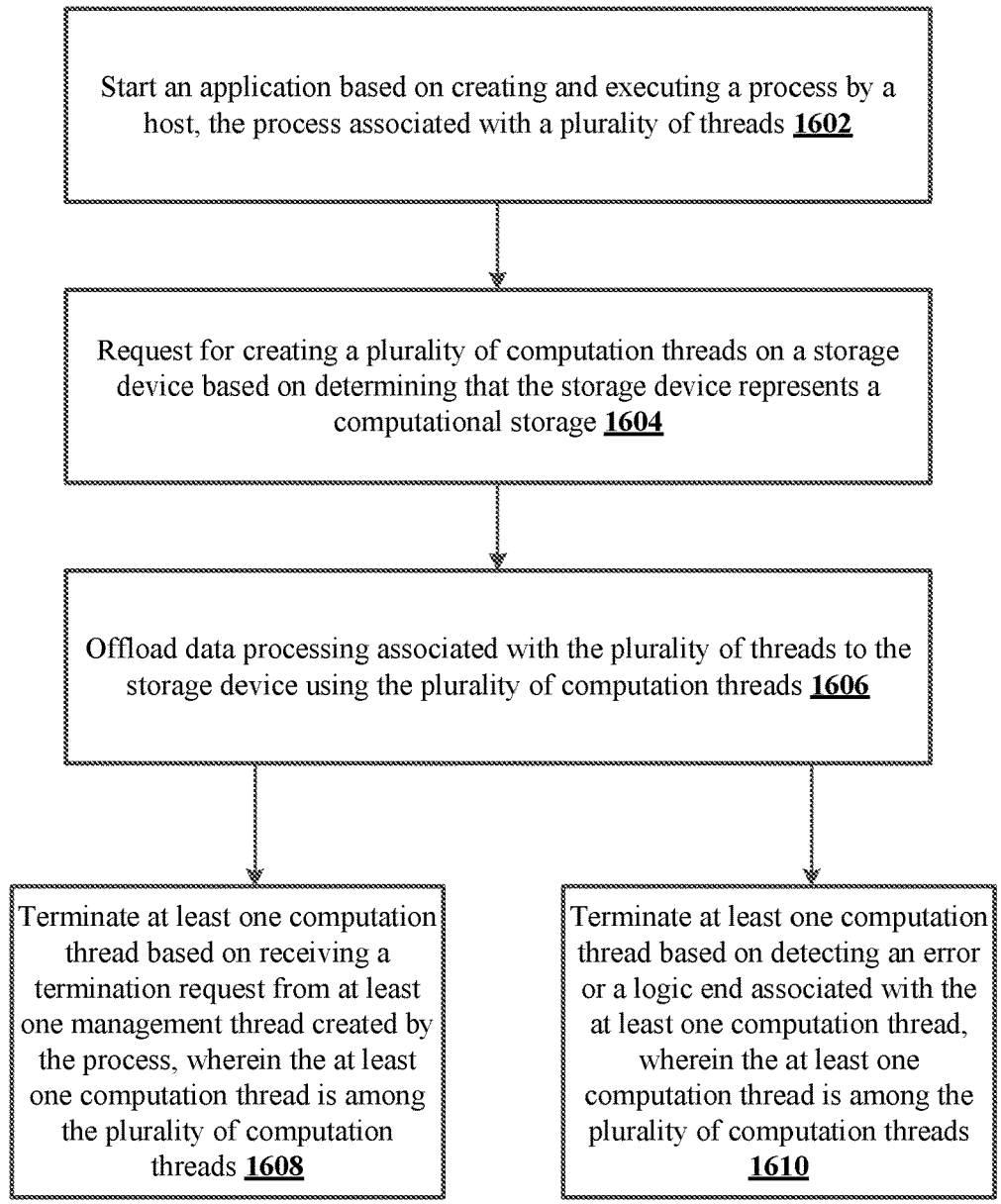
FIG. 16 illustrates another example process for accelerating data processing in accordance with the present disclosure.

FIG. 16 illustrates an example process 1600 for accelerating data processing in accordance with the present disclosure. For example, the process 1600 may be performed, at least in part, by a framework for data processing using a computational storage. Although depicted as a sequence of operations in FIG. 16, those of ordinary skill in the art will appreciate that various embodiments may add, remove, reorder, or modify the depicted operations.

At 1602, an application may be started based on creating and executing a process by a host. The process may be associated with a plurality of threads. For example, starting the application may comprise the moving of an initial process image on host side. When a user requests to start an application, the user may provide the name and the path of the executable file. The OS may perform the fork operation. The fork operation involves the copying of an image of any existing process inside of the DRAM memory.

It may be determined that a storage device represents a computational storage. At 1604, creating a plurality of computation threads on the storage device may be requested based on determining that the storage device represents a computational storage. The plurality of computation threads may be created based on preloading a plurality of libraries in the storage device. The plurality of libraries may comprise executable codes associated with the plurality of threads. For example, executable binary files may be pre-loaded into a DRAM of the storage device. All libraries may be pre-loaded before the real execution as a part of the application start. Additionally, or alternatively, the libraries may be pre-loaded at the time of a particular function call.

The completion of the pre-load operation may indicate that the creation of the thread image is ready for execution in computational storage. The computational storage may inform the host that the computation threads are created and ready for execution. At 1606, data processing associated with the plurality of threads may be offloaded to the storage device using the plurality of computation threads.

To terminate an application, the process may issue a termination command or a termination request to all computation threads in computational storage. In response to receiving the termination command or termination request, the management thread on host side can issue an I/O request for the computation thread(s) on the computational storage side to finish execution. For example, a management thread may send a request to a computation thread to terminate. In response to receiving the request to terminate, the computation thread may execute a termination logic or a destruction logic and free resources. At 1608, at least one computation thread may be terminated based on receiving a termination request from at least one management thread created by the process. The at least one computation thread may be among the plurality of computation threads.

In certain embodiments, the behavior of computation thread depends on execution logic. Some computation threads can be terminated after finishing the algorithm's logic. For example, such computation threads may be terminated on the computational storage side. A computation thread may detect an error or logic end. In response to detecting the error or logic end, the computation thread may execute the destruction logic. At 1610, at least one computation thread may be terminated based on detecting an error or a logic end associated with the at least one computation thread. The at least one computation thread may be among the plurality of computation threads. After executing the destruction logic, the at least one computation thread may return a termination status of the terminated computation thread to the corresponding management thread on the host side. The corresponding management thread may be terminated in in response to receiving the termination status of the terminated computation thread.

Figure 17:
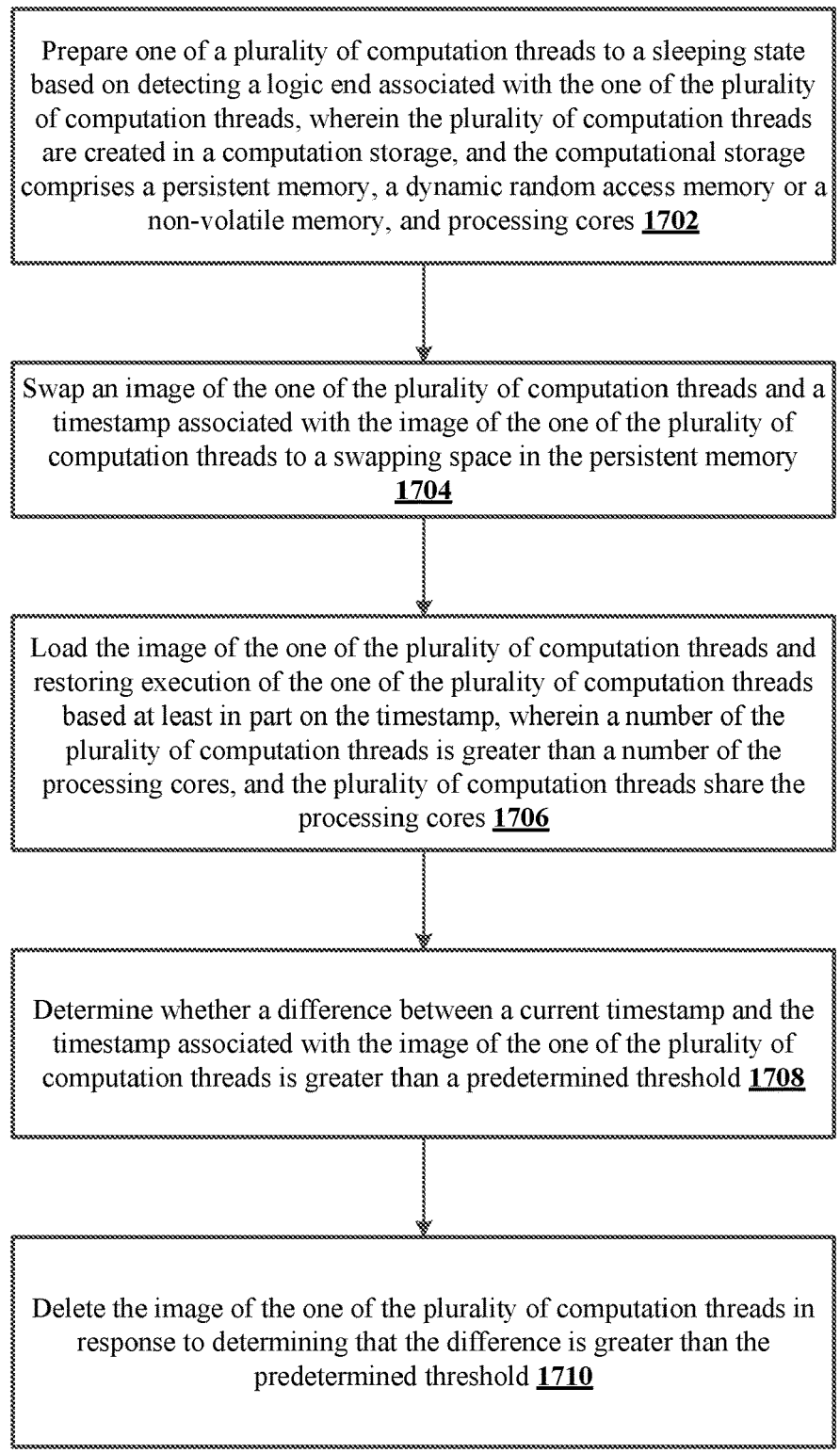
FIG. 17 illustrates another example process for accelerating data processing in accordance with the present disclosure.

FIG. 17 illustrates an example process 1700 for accelerating data processing in accordance with the present disclosure. For example, the process 1700 may be performed, at least in part, by a framework for data processing using a computational storage. Although depicted as a sequence of operations in FIG. 17, those of ordinary skill in the art will appreciate that various embodiments may add, remove, reorder, or modify the depicted operations.

A regular (e.g., non-zombie) computation thread may be managed, such as by a management thread. The algorithm's logic associated with the computation thread may finish. At 1702, one of a plurality of computation threads may be prepared to a sleeping state based on detecting a logic end associated with the one of the plurality of computation threads. The plurality of computation threads may be created in a computational storage and the computational storage comprises a persistent memory, a dynamic random-access memory or a non-volatile memory, and processing cores.

The computational storage can use the persistent memory like a swap space to keep the image of computation thread that is awaiting execution time slices. Every computation thread's image can be associated with timestamp (and/or any other metadata) that is stored during the swapping of the sleeping thread image. At 1704, an image of the one of the plurality of computation threads and a timestamp associated with the image of the one of the plurality of computation threads may be swapped to a swapping space in the persistent memory.

The image of the computation threads may be loaded, and execution of the computation thread may be restored based at least in part on the timestamp. At 1706, the image of the one of the plurality of computation threads may be loaded and execution of the one of the plurality of computation threads may be restored based at least in part on the timestamp. A number of the plurality of computation threads may be greater than a number of the processing cores. The plurality of computation threads may share the processing cores.

If a computation thread is a zombie computation thread, it may be terminated. A current timestamp associated with the one of the computation threads may be calculated. At 1708, it may be determined whether a difference between a current timestamp and the timestamp associated with the image of the one of the plurality of computation threads is greater than a predetermined threshold. If it is determined that the difference between the current timestamp and the timestamp associated with the image of the computation thread is greater than the predetermined threshold, the thread image may be deleted. At 1710, the image of the one of the plurality of computation threads may be deleted in response to determining that the difference is greater than the predetermined threshold.

Figure 18:
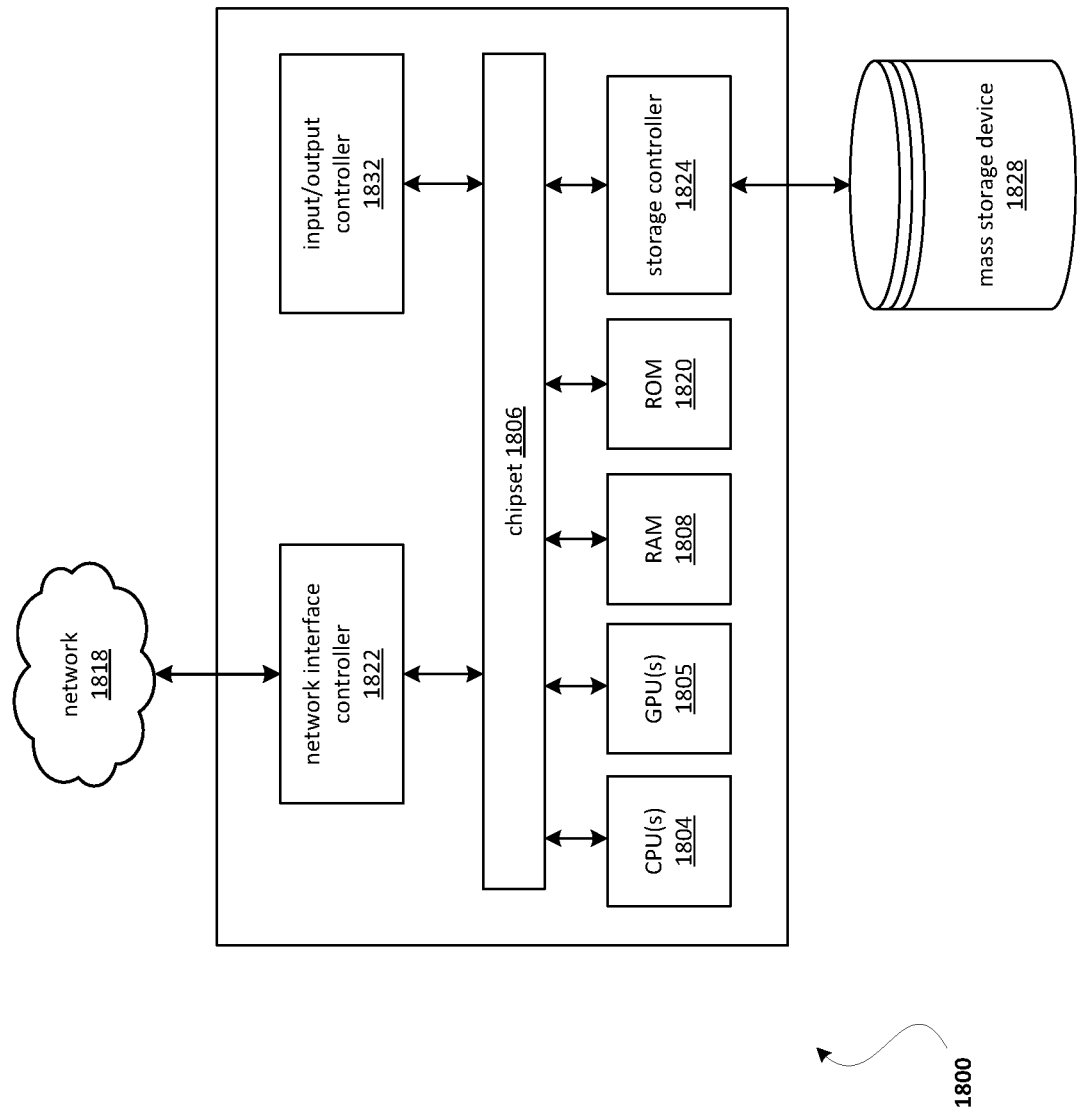
FIG. 18 illustrates an example computing device which may be used to perform any of the techniques disclosed herein.

FIG. 18 illustrates a computing device that may be used in various aspects, such as the services, networks, modules, and/or devices depicted in FIGS. 1-9. The computer architecture shown in FIG. 18 shows a conventional server computer, workstation, desktop computer, laptop, tablet, network appliance, PDA, e-reader, digital cellular phone, or other computing node, and may be utilized to execute any aspects of the computers described herein, such as to implement the methods described herein.

The computing device 1800 may include a baseboard, or "motherboard," which is a printed circuit board to which a multitude of components or devices may be connected by way of a system bus or other electrical communication paths. One or more central processing units (CPUs) 1804 may operate in conjunction with a chipset 1806. The CPU(s) 1804 may be standard programmable processors that perform arithmetic and logical operations necessary for the operation of the computing device 1800.

The CPU(s) 1804 may perform the necessary operations by transitioning from one discrete physical state to the next through the manipulation of switching elements that differentiate between and change these states. Switching elements may generally include electronic circuits that maintain one of two binary states, such as flip-flops, and electronic circuits that provide an output state based on the logical combination of the states of one or more other switching elements, such as logic gates. These basic switching elements may be combined to create more complex logic circuits including registers, adders-subtractors, arithmetic logic units, floating-point units, and the like.

The CPU(s) 1804 may be augmented with or replaced by other processing units, such as GPU(s) 1805. The GPU(s) 1805 may comprise processing units specialized for but not necessarily limited to highly parallel computations, such as graphics and other visualization-related processing.

A chipset 1806 may provide an interface between the CPU(s) 1804 and the remainder of the components and devices on the baseboard. The chipset 1806 may provide an interface to a random-access memory (RAM) 1808 used as the main memory in the computing device 1800. The chipset 1806 may further provide an interface to a computer-readable storage medium, such as a read-only memory (ROM) 1820 or non-volatile RAM (NVRAM) (not shown), for storing basic routines that may help to start up the computing device 1800 and to transfer information between the various components and devices. ROM 1820 or NVRAM may also store other software components necessary for the operation of the computing device 1800 in accordance with the aspects described herein.

The computing device 1800 may operate in a networked environment using logical connections to remote computing nodes and computer systems through local area network (LAN). The chipset 1806 may include functionality for providing network connectivity through a network interface controller (NIC) 1822, such as a gigabit Ethernet adapter. A NIC 1822 may be capable of connecting the computing device 1800 to other computing nodes over a network 1816. It should be appreciated that multiple NICs 1822 may be present in the computing device 1800, connecting the computing device to other types of networks and remote computer systems.

The computing device 1800 may be connected to a mass storage device 1828 that provides non-volatile storage for the computer. The mass storage device 1828 may store system programs, application programs, other program modules, and data, which have been described in greater detail herein. The mass storage device 1828 may be connected to the computing device 1800 through a storage controller 1824 connected to the chipset 1806. The mass storage device 1828 may consist of one or more physical storage units. The mass storage device 1828 may comprise a management component 1818. A storage controller 1824 may interface with the physical storage units through a serial attached SCSI (SAS) interface, a serial advanced technology attachment (SATA) interface, a fiber channel (FC) interface, or other type of interface for physically connecting and transferring data between computers and physical storage units.

The computing device 1800 may store data on the mass storage device 1828 by transforming the physical state of the physical storage units to reflect the information being stored. The specific transformation of a physical state may depend on various factors and on different implementations of this description. Examples of such factors may include, but are not limited to, the technology used to implement the physical storage units and whether the mass storage device 1828 is characterized as primary or secondary storage and the like.

For example, the computing device 1800 may store information to the mass storage device 1828 by issuing instructions through a storage controller 1824 to alter the magnetic characteristics of a particular location within a magnetic disk drive unit, the reflective or refractive characteristics of a particular location in an optical storage unit, or the electrical characteristics of a particular capacitor, transistor, or other discrete component in a solid-state storage unit. Other transformations of physical media are possible without departing from the scope and spirit of the present description, with the foregoing examples provided only to facilitate this description. The computing device 1800 may further read information from the mass storage device 1828 by detecting the physical states or characteristics of one or more particular locations within the physical storage units.

In addition to the mass storage device 1828 described above, the computing device 1800 may have access to other computer-readable storage media to store and retrieve information, such as program modules, data structures, or other data. It should be appreciated by those skilled in the art that computer-readable storage media may be any available media that provides for the storage of non-transitory data and that may be accessed by the computing device 1800.

By way of example and not limitation, computer-readable storage media may include volatile and non-volatile, transitory computer-readable storage media and non-transitory computer-readable storage media, and removable and non-removable media implemented in any method or technology. Computer-readable storage media includes, but is not limited to, RAM, ROM, erasable programmable ROM ("EPROM"), electrically erasable programmable ROM ("EEPROM"), flash memory or other solid-state memory technology, compact disc ROM ("CD-ROM"), digital versatile disk ("DVD"), high definition DVD ("HD-DVD"), BLU-RAY, or other optical storage, magnetic cassettes, magnetic tape, magnetic disk storage, other magnetic storage devices, or any other medium that may be used to store the desired information in a non-transitory fashion.

A mass storage device, such as the mass storage device 1828 depicted in FIG. 18, may store an operating system utilized to control the operation of the computing device 1800. The operating system may comprise a version of the LINUX operating system. The operating system may comprise a version of the WINDOWS SERVER operating system from the MICROSOFT Corporation. According to further aspects, the operating system may comprise a version of the UNIX operating system. Various mobile phone operating systems, such as IOS and ANDROID, may also be utilized. It should be appreciated that other operating systems may also be utilized. The mass storage device 1828 may store other system or application programs and data utilized by the computing device 1800.

The mass storage device 1828 or other computer-readable storage media may also be encoded with computer-executable instructions, which, when loaded into the computing device 1800, transforms the computing device from a general-purpose computing system into a special-purpose computer capable of implementing the aspects described herein. These computer-executable instructions transform the computing device 1800 by specifying how the CPU(s) 1804 transition between states, as described above. The computing device 1800 may have access to computer-readable storage media storing computer-executable instructions, which, when executed by the computing device 1800, may perform the methods described herein.

A computing device, such as the computing device 1800 depicted in FIG. 18, may also include an input/output controller 1832 for receiving and processing input from a number of input devices, such as a keyboard, a mouse, a touchpad, a touch screen, an electronic stylus, or other type of input device. Similarly, an input/output controller 1832 may provide output to a display, such as a computer monitor, a flat-panel display, a digital projector, a printer, a plotter, or other type of output device. It will be appreciated that the computing device 1800 may not include all of the components shown in FIG. 18, may include other components that are not explicitly shown in FIG. 18, or may utilize an architecture completely different than that shown in FIG. 18.

As described herein, a computing device may be a physical computing device, such as the computing device 1800 of FIG. 18. A computing node may also include a virtual machine host process and one or more virtual machine instances. Computer-executable instructions may be executed by the physical hardware of a computing device indirectly through interpretation and/or execution of instructions stored and executed in the context of a virtual machine.

It is to be understood that the methods and systems are not limited to specific methods, specific components, or to particular implementations. It is also to be understood that the terminology used herein is for the purpose of describing particular embodiments only and is not intended to be limiting.

As used in the specification and the appended claims, the singular forms "a," "an," and "the" include plural referents unless the context clearly dictates otherwise. Ranges may be expressed herein as from "about" one particular value, and/or to "about" another particular value. When such a range is expressed, another embodiment includes from the one particular value and/or to the other particular value. Similarly, when values are expressed as approximations, by use of the antecedent "about," it will be understood that the particular value forms another embodiment. It will be further understood that the endpoints of each of the ranges are significant both in relation to the other endpoint, and independently of the other endpoint.

"Optional" or "optionally" means that the subsequently described event or circumstance may or may not occur, and that the description includes instances where said event or circumstance occurs and instances where it does not.

Throughout the description and claims of this specification, the word "comprise" and variations of the word, such as "comprising" and "comprises," means "including but not limited to," and is not intended to exclude, for example, other components, integers or steps. "Exemplary" means "an example of" and is not intended to convey an indication of a preferred or ideal embodiment. "Such as" is not used in a restrictive sense, but for explanatory purposes.

Components are described that may be used to perform the described methods and systems. When combinations, subsets, interactions, groups, etc., of these components are described, it is understood that while specific references to each of the various individual and collective combinations and permutations of these may not be explicitly described, each is specifically contemplated and described herein, for all methods and systems. This applies to all aspects of this application including, but not limited to, operations in described methods. Thus, if there are a variety of additional operations that may be performed it is understood that each of these additional operations may be performed with any specific embodiment or combination of embodiments of the described methods.

The present methods and systems may be understood more readily by reference to the following detailed description of preferred embodiments and the examples included therein and to the Figures and their descriptions.

As will be appreciated by one skilled in the art, the methods and systems may take the form of an entirely hardware embodiment, an entirely software embodiment, or an embodiment combining software and hardware aspects. Furthermore, the methods and systems may take the form of a computer program product on a computer-readable storage medium having computer-readable program instructions (e.g., computer software) embodied in the storage medium. More particularly, the present methods and systems may take the form of web-implemented computer software. Any suitable computer-readable storage medium may be utilized including hard disks, CD-ROMs, optical storage devices, or magnetic storage devices.

Embodiments of the methods and systems are described below with reference to block diagrams and flowchart illustrations of methods, systems, apparatuses and computer program products. It will be understood that each block of the block diagrams and flowchart illustrations, and combinations of blocks in the block diagrams and flowchart illustrations, respectively, may be implemented by computer program instructions. These computer program instructions may be loaded on a general-purpose computer, special-purpose computer, or other programmable data processing apparatus to produce a machine, such that the instructions which execute on the computer or other programmable data processing apparatus create a means for implementing the functions specified in the flowchart block or blocks.

These computer program instructions may also be stored in a computer-readable memory that may direct a computer or other programmable data processing apparatus to function in a particular manner, such that the instructions stored in the computer-readable memory produce an article of manufacture including computer-readable instructions for implementing the function specified in the flowchart block or blocks. The computer program instructions may also be loaded onto a computer or other programmable data processing apparatus to cause a series of operational steps to be performed on the computer or other programmable apparatus to produce a computer-implemented process such that the instructions that execute on the computer or other programmable apparatus provide steps for implementing the functions specified in the flowchart block or blocks.

The various features and processes described above may be used independently of one another or may be combined in various ways. All possible combinations and sub-combinations are intended to fall within the scope of this disclosure. In addition, certain methods or process blocks may be omitted in some implementations. The methods and processes described herein are also not limited to any particular sequence, and the blocks or states relating thereto may be performed in other sequences that are appropriate.

For example, described blocks or states may be performed in an order other than that specifically described, or multiple blocks or states may be combined in a single block or state. The example blocks or states may be performed in serial, in parallel, or in some other manner. Blocks or states may be added to or removed from the described example embodiments. The example systems and components described herein may be configured differently than described. For example, elements may be added to, removed from, or rearranged compared to the described example embodiments.

It will also be appreciated that various items are illustrated as being stored in memory or on storage while being used, and that these items or portions thereof may be transferred between memory and other storage devices for purposes of memory management and data integrity. Alternatively, in other embodiments, some or all of the software modules and/or systems may execute in memory on another device and communicate with the illustrated computing systems via inter-computer communication. Furthermore, in some embodiments, some or all of the systems and/or modules may be implemented or provided in other ways, such as at least partially in firmware and/or hardware, including, but not limited to, one or more application-specific integrated circuits ("ASICs"), standard integrated circuits, controllers (e.g., by executing appropriate instructions, and including microcontrollers and/or embedded controllers), field-programmable gate arrays ("FPGAs"), complex programmable logic devices ("CPLDs"), etc.

Some or all of the modules, systems, and data structures may also be stored (e.g., as software instructions or structured data) on a computer-readable medium, such as a hard disk, a memory, a network, or a portable media article to be read by an appropriate device or via an appropriate connection. The systems, modules, and data structures may also be transmitted as generated data signals (e.g., as part of a carrier wave or other analog or digital propagated signal) on a variety of computer-readable transmission media, including wireless-based and wired/cable-based media, and may take a variety of forms (e.g., as part of a single or multiplexed analog signal, or as multiple discrete digital packets or frames). Such computer program products may also take other forms in other embodiments. Accordingly, the present invention may be practiced with other computer system configurations.

While the methods and systems have been described in connection with preferred embodiments and specific examples, it is not intended that the scope be limited to the particular embodiments set forth, as the embodiments herein are intended in all respects to be illustrative rather than restrictive.

Unless otherwise expressly stated, it is in no way intended that any method set forth herein be construed as requiring that its operations be performed in a specific order. Accordingly, where a method claim does not actually recite an order to be followed by its operations or it is not otherwise specifically stated in the claims or descriptions that the operations are to be limited to a specific order, it is no way intended that an order be inferred, in any respect. This holds for any possible non-express basis for interpretation, including: matters of logic with respect to arrangement of steps or operational flow; plain meaning derived from grammatical organization or punctuation; and the number or type of embodiments described in the specification.

It will be apparent to those skilled in the art that various modifications and variations may be made without departing from the scope or spirit of the present disclosure. Other embodiments will be apparent to those skilled in the art from consideration of the specification and practices described herein. It is intended that the specification and example figures be considered as exemplary only, with a true scope and spirit being indicated by the following claims.

What is claimed is:

1. A method of accelerating data processing by offloading thread computation, comprising:
   starting an application based on creating and executing a process by a host, the process associated with a plurality of threads;
   requesting for creating a plurality of computation threads on a storage device based on determining that the storage device represents a computational storage, wherein the plurality of computation threads are created based on preloading a plurality of libraries in the storage device, and wherein the plurality of libraries comprise executable codes associated with the plurality of threads;
   offloading data processing associated with the plurality of threads to the storage device using the plurality of computation threads;
   managing activities associated with the plurality of computation threads by the process;
   wherein the computational storage comprises a persistent memory and processing cores, and wherein the method further comprises:
   preparing one of the plurality of computation threads to a sleeping state based on detecting a logic end associated with the one of the plurality of computation threads;
   swapping an image of the one of the plurality of computation threads and a timestamp associated with the image of the one of the plurality of computation threads to a swapping space in the persistent memory; and
   loading the image of the one of the plurality of computation threads and restoring execution of the one of the plurality of computation threads based at least in part on the timestamp, wherein a number of the plurality of computation threads is greater than a number of the processing cores, and the plurality of computation threads share the processing cores.

2. The method of claim 1, further comprising:
   managing the activities associated with the plurality of computation threads based on a main logic of the application.

3. The method of claim 1, further comprising:
   managing the activities associated with the plurality of computation threads using at least one management thread created by the process.

4. The method of claim 3, wherein the at least one management thread is configured to issue the storage device a computational request and go to sleep until being woken up by receiving a computation result from the storage device.

5. The method of claim 3, further comprising:
   preparing, by the at least one management thread, a request for processing data by at least one computation thread at a particular time point, wherein the request comprises information indicating a location of the data to be processed by the at least one computation thread, wherein the at least one computation thread is among the plurality of computation threads, and wherein the data are stored on the storage device; and
   storing the request to a queue on the storage device.

6. The method of claim 3, further comprising:
   polling, by the at least one management thread, the plurality of computation threads to track status of the plurality of computation threads; and
   requesting for terminating one of the plurality of computation threads in response to determining that no answer is received from the one of the plurality of computation threads or the one of the plurality of computation threads is under execution more than a predetermined time threshold.

7. The method of claim 1, further comprising:
   executing the plurality of computation threads on at least a portion of data in a massively parallel manner, wherein the data are stored on the storage device.

8. The method of claim 1, further comprising:
   terminating at least one computation thread based on receiving a termination request from at least one management thread created by the process, wherein the at least one computation thread is among the plurality of computation threads.

9. The method of claim 1, wherein the computational storage further comprises a dynamic random access memory or a non-volatile memory.

10. The method of claim 1, further comprising:
    determining a current timestamp;
    determining whether a difference between the current timestamp and the timestamp associated with the image of the one of the plurality of computation threads is greater than a predetermined threshold; and
    deleting the image of the one of the plurality of computation threads in response to determining that the difference is greater than the predetermined threshold.

11. A system of accelerating data processing by offloading thread computation, comprising:
    at least one processor; and
    at least one memory comprising computer-readable instructions that upon execution by the at least one processor cause the system to perform operations comprising:
    starting an application based on creating and executing a process by a host, the process associated with a plurality of threads;
    requesting for creating a plurality of computation threads on a storage device based on determining that the storage device represents a computational storage, wherein the plurality of computation threads are created based on preloading a plurality of libraries in the storage device, and wherein the plurality of libraries comprise executable codes associated with the plurality of threads;

offloading data processing associated with the plurality of threads to the storage device using the plurality of computation threads;

managing activities associated with the plurality of computation threads by the process;

wherein the computational storage comprises a persistent memory and processing cores, and wherein the operations further comprise:

preparing one of the plurality of computation threads to a sleeping state based on detecting a logic end associated with the one of the plurality of computation threads;

swapping an image of the one of the plurality of computation threads and a timestamp associated with the image of the one of the plurality of computation threads to a swapping space in the persistent memory; and loading the image of the one of the plurality of computation threads and restoring execution of the one of the plurality of computation threads based at least in part on the timestamp, wherein a number of the plurality of computation threads is greater than a number of the processing cores, and the plurality of computation threads share the processing cores.

12. The system of claim 11, the operations further comprising:

managing the activities associated with the plurality of computation threads based on a main logic of the application.

13. The system of claim 11, the operations further comprising:

managing the activities associated with the plurality of computation threads using at least one management thread created by the process, wherein the at least one management thread is configured to issue the storage device a computational request and go to sleep until being woken up by receiving a computation result from the storage device.

14. The system of claim 13, the operations further comprising:

preparing, by the at least one management thread, a request for processing data by at least one computation thread at a particular time point, wherein the request comprises information indicating a location of the data to be processed by the at least one computation thread, wherein the at least one computation thread is among the plurality of computation threads, and wherein the data are stored on the storage device; and storing the request to a queue on the storage device.

15. The system of claim 13, the operations further comprising:

polling, by the at least one management thread, the plurality of computation threads to track status of the plurality of computation threads; and requesting for terminating one of the plurality of computation threads in response to determining that no answer is received from the one of the plurality of computation threads or the one of the plurality of computation threads is under execution more than a predetermined time threshold.

16. A non-transitory computer-readable storage medium, storing computer-readable instructions that upon execution by a processor cause the processor to implement operations, the operations comprising:

starting an application based on creating and executing a process by a host, the process associated with a plurality of threads;

requesting for creating a plurality of computation threads on a storage device based on determining that the storage device represents a computational storage, wherein the plurality of computation threads are created based on preloading a plurality of libraries in the storage device, and wherein the plurality of libraries comprise executable codes associated with the plurality of threads;

offloading data processing associated with the plurality of threads to the storage device using the plurality of computation threads;

managing activities associated with the plurality of computation threads by the process;

wherein the computational storage comprises a persistent memory and processing cores, and wherein the operations further comprise:

preparing one of the plurality of computation threads to a sleeping state based on detecting a logic end associated with the one of the plurality of computation threads;

swapping an image of the one of the plurality of computation threads and a timestamp associated with the image of the one of the plurality of computation threads to a swapping space in the persistent memory; and loading the image of the one of the plurality of computation threads and restoring execution of the one of the plurality of computation threads based at least in part on the timestamp, wherein a number of the plurality of computation threads is greater than a number of the processing cores, and the plurality of computation threads share the processing cores.

17. The non-transitory computer-readable storage medium of claim 16, the operations further comprising:

managing the activities associated with the plurality of computation threads using at least one management thread created by the process, wherein the at least one management thread is configured to issue the storage device a computational request and go to sleep until being woken up by receiving a computation result from the storage device.

18. The non-transitory computer-readable storage medium of claim 17, the operations further comprising:

preparing, by the at least one management thread, a request for processing data by at least one computation thread at a particular time point, wherein the request comprises information indicating a location of the data to be processed by the at least one computation thread, wherein the at least one computation thread is among the plurality of computation threads, and wherein the data are stored on the storage device; and storing the request to a queue on the storage device.

19. The non-transitory computer-readable storage medium of claim 17, the operations further comprising:

polling, by the at least one management thread, the plurality of computation threads to track status of the plurality of computation threads; and requesting for terminating one of the plurality of computation threads in response to determining that no answer is received from the one of the plurality of computation threads or the one of the plurality of computation threads is under execution more than a predetermined time threshold.

20. The method of claim 1, further comprising:
terminating at least one computation thread based on detecting an error or a logic end associated with the at least one computation thread, wherein the at least one computation thread is among the plurality of computation threads.

\* \* \* \* \*